(12) United States Patent
Kalevo

(10) Patent No.: US 8,315,469 B2
(45) Date of Patent: Nov. 20, 2012

(54) METHODS AND APPARATUSES FOR ENCODING AND DECODING AN IMAGE

(75) Inventor: Ossi Kalevo, Toijala (FI)

(73) Assignee: Nokia Corporation, Espoo (FI)

( * ) Notice: Subject to any disclaimer, the term of this patent is extended or adjusted under 35 U.S.C. 154(b) by 1064 days.

(21) Appl. No.: 12/229,065

(22) Filed: Aug. 18, 2008

(65) Prior Publication Data

US 2009/0067734 A1    Mar. 12, 2009

(30) Foreign Application Priority Data

Aug. 16, 2007    (WO) .................. PCT/FI2007/050445

(51) Int. Cl.
*G06K 9/36* (2006.01)
*G06K 9/46* (2006.01)

(52) U.S. Cl. ..................................................... 382/238

(58) Field of Classification Search .................. 382/232, 382/233, 238; 375/233, 242, 253; 348/207, 348/497; 341/51, 59, 67, 82, 89, 106, 107; 714/758
See application file for complete search history.

(56) References Cited

U.S. PATENT DOCUMENTS

| | | | | |
|---|---|---|---|---|
| 3,675,211 A * | 7/1972 | Raviv | ................................ | 341/67 |
| 4,561,015 A * | 12/1985 | Korch | ............................ | 348/340 |
| 4,734,768 A | 3/1988 | Pexa | | |
| 5,311,177 A * | 5/1994 | Kimura et al. | .................... | 341/51 |
| 5,392,037 A | 2/1995 | Kato | | |
| 5,424,968 A * | 6/1995 | Okamoto | ....................... | 708/505 |
| 5,991,340 A * | 11/1999 | Isomura | .......................... | 375/253 |
| 6,154,493 A | 11/2000 | Acharya et al. | | |
| 6,434,717 B1 * | 8/2002 | Fujii | ............................... | 714/758 |
| 6,577,255 B2 * | 6/2003 | Hayami et al. | .................... | 341/59 |
| 6,654,503 B1 | 11/2003 | Sudharsanan et al. | | |
| 6,717,986 B1 * | 4/2004 | Ueno | ............................. | 375/233 |
| 6,894,727 B2 * | 5/2005 | Okada et al. | ................... | 348/497 |
| 7,289,046 B2 * | 10/2007 | Sako et al. | ........................ | 341/59 |
| 7,667,630 B2 * | 2/2010 | Harada et al. | .................. | 341/106 |
| 2004/0202375 A1 | 10/2004 | Kalevo | | |
| 2009/0067734 A1 * | 3/2009 | Kalevo | ........................... | 382/238 |

FOREIGN PATENT DOCUMENTS

| | | |
|---|---|---|
| EP | 1 605 705 | 12/2005 |
| WO | 2004/064402 | 7/2004 |
| WO | 2005/116927 | 12/2005 |
| WO | 2006/112992 | 10/2006 |

OTHER PUBLICATIONS

Extended European Search Report dated Mar. 25, 2011 in parallel European Patent Application No. 07803708.2 including ESSR Transmittal (1 page), European Search Opinion (4 pages) and Supplementary European Search Report (2 pages) (7 pages total).

* cited by examiner

*Primary Examiner* — Amir Alavi

(74) *Attorney, Agent, or Firm* — Harrington & Smith

(57) ABSTRACT

A method as well as a system, a device, an encoding apparatus, a decoding apparatus, a module and a computer software product for image processing is disclosed. The image comprises a pixel matrix, in which the pixels comprise a first number of bits. The pixel matrix is divided to two or more blocks of pixels. The pixels are processed on a block-by-block basis to form encoded pixel values including a certain second number of bits. Bit strings are formed on the basis of the encoded pixels. When decoding the image the bit strings are examined to find out the encoding method used in encoding the pixel, and decoding is performed on a block-by-block basis to retrieve pixel values of the image.

52 Claims, 7 Drawing Sheets

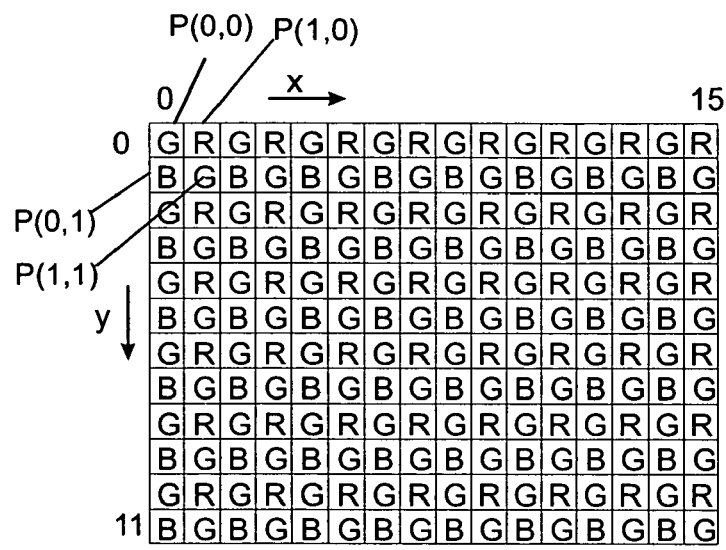
Fig. 2a
Fig. 2b
Fig. 2c
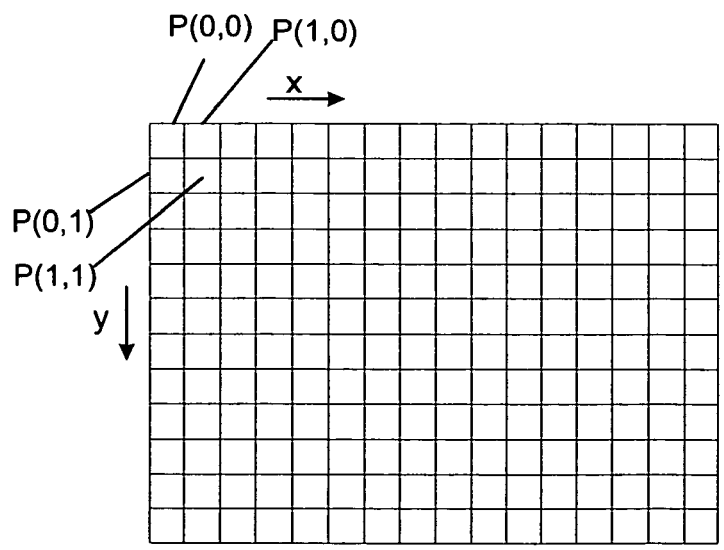
Fig. 2d

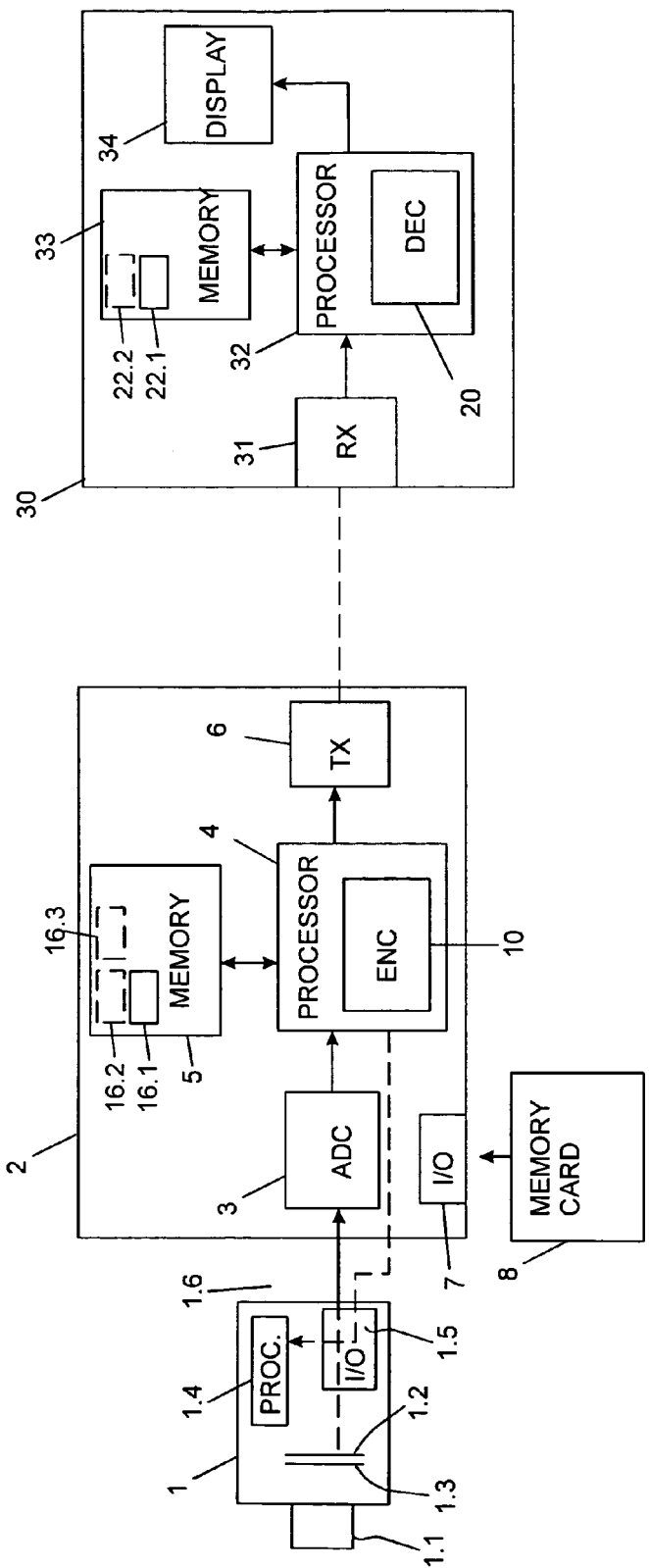
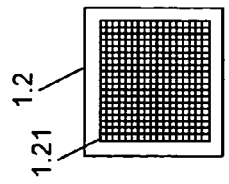
Fig. 3a
Fig. 3b

METHODS AND APPARATUSES FOR ENCODING AND DECODING AN IMAGE

CROSS-REFERENCE TO RELATED APPLICATIONS

This application claims priority under 35 USC §119 to International Patent Application No. PCT/FI2007/050445 filed on Aug. 16, 2007.

FIELD OF THE INVENTION

The present invention relates to a method for encoding an image comprising an array of pixels. The invention also relates to an encoding apparatus for encoding an image comprising an array of pixels, and a method for decoding the encoded image and a decoding apparatus. The invention further relates to a module for encoding an image, a module for decoding an image, a camera and a device comprising the encoder, a device comprising the decoder and a device comprising the camera. The invention also relates to a computer readable medium storing a computer program for encoding an image, and a computer readable medium storing a computer program for decoding an image.

BACKGROUND OF THE INVENTION

Image information can be formed by e.g. cameras having image sensors, which comprise a plurality of photosensitive elements. These photosensitive elements can be arranged into a matrix form comprising k rows and I columns. The parameters k and I are greater or equal to 1. Further, the parameters k and I need not be equal. For example, a image sensor can have photosensitive elements arranged into 230 rows and 340 columns, thus the image sensor can produce an image of 340×230 pixels. The term pixel is a contraction of the term picture element. Other known image sizes are, for example, 400×336 pixels, 752×582 pixels, and 1920×1024 pixels. These are only non-limiting examples and other image sizes have been used besides those mentioned above.

In a color image there are a certain number of different color components. Typically three color components are used, which in a widely used color format are red, green and blue (RGB). The color components need not be distributed over the image area in such a way that there is an equal number of each of these color components or that every third color component in a line is the same. For example, in the so called Bayer matrix image the data of a color image is represented in such a way that between two identical color components on the same line, there is another color component (for example, GRGRGR or BGBGBG, in which R means red color component, G means green color component, and B means blue color component).

Image sensors comprise semiconductor cells, such as CCD (Charge Coupled Device) or CMOS (Complementary Metal-Oxide Semiconductor) cells comprising a photosensitive element. The operation of the sensor in the cell is based on, for example, the principle that when radiation impinges on the photosensitive elements, the photosensitive elements are electrically charged. The amount of the charge is dependent on inter alia the intensity of the radiation and the radiation time. For color detection, the photosensitive elements of the cells are covered by a filter which passes through radiation in a certain wavelength range. For example, in the above mentioned RGB color system the photosensitive elements are covered by a red filter, a green filter or a blue filter, forming a color filter array. The term red filter means a filter which passes through mainly radiation at the wavelength area which a human eye recognizes as a red color. Respectively, the term green filter means a filter which passes through mainly radiation at the wavelength area which a human eye recognizes as a green color, and term blue filter means a filter which passes through mainly radiation at the wavelength area which a human eye recognizes as a blue color. The number of each color in the color filter array is not necessarily the same but, for example, half of the filters are green, a quarter of the filters are red and another quarter of the filters are blue.

When the signal formed by an image sensor is digitized, a number (N) of bits (for example, 8, 10 or 12 bits) per each pixel are formed the value of the bits depending on the intensity (e.g. a voltage level) of the signal. Sometimes there may be a need to convert the pixel data of an image to a smaller size, for example to reduce the amount of memory needed to store an image or a part of an image or to reduce the bandwidth needed to transmit the image data through an interface or through a transmission channel.

Furthermore, the compression of the image may be necessary to enable one to produce and display images with devices having less computing capacity and/or memory than larger scale computing devices. For example, many mobile communication devices are such devices in which processing capacity for producing and displaying images is limited. In mobile communication devices, the use of images is largely similar to the use in computers. Images are stored in the device or a memory device attached with the device and the images are transmitted to another device across a communication network in use. The transmission of images in the communication network, such as a mobile telephone network, is problematic because of the large quantity of information to be transferred. Also interfaces, such as a memory interface or an interface between a camera and a processor, may require that the image data need to be compressed for transmitting through the interface.

It is also possible that the captured N bits image has to be stored to an M bits temporal memory before processing. Usually 1 byte of memory consists of 8 bits and so storing e.g. 10 bits per pixel is not very popular, but 8 bits per pixel is used. Sometimes, it is also required that there should be many synchronization points in the saved bitstream. E.g. each line of the image can be decoded separately, if the decoded line does not require any information outside the line.

Differential pulse code modulation (DPCM) is a known method by which a pixel is encoded/transmitted on the basis of a pixel preceding the pixel to be encoded. The method is used for the conversion of an analog signal to a digital signal, wherein the difference between a sampled value of the analog signal and its predicted value is quantized and encoded in digital format. Code words formed by the DPCM method represent differences between successive values.

A differential pulse code modulation (DPCM) codec can be used to reduce redundancy between image pixels. By differentiating the pulse code modulated (PCM) code words, a DPCM code word sequence of variable length is obtained, which normally compresses the given data to a format suitable for the transmission. Because the code words are normally of variable length, the resulting code word is not always necessarily shorter than or equal to a limit value (M) (a predetermined number of bits), because the longest code word is longer than the original number (N) of bits. To make the code word shorter than the limit value (M), the DPCM code words are quantized, after which the compression method becomes lossy i.e. some information may be lost due to the quantization.

When a lossy codec is used the aim is that the decoded result image is as near the encoded original image as possible. There are at least three good properties of image codecs; simple to implement, do not require big buffers and if possible they use fixed length codes. The fixed length codes are easier to decode and usually the output is suitable for the transmission. Also buffering can be smaller, or it is not needed at all, when fixed length codes are used. Sometimes it can also be required that some symbol (e.g. 0) should not be presented in the bitstream so that e.g. wrong start code is avoided.

Look-up-tables (LUT) can also be used in encoding pixel values. Look-up-tables consist of table of replacement values which will replace the original value (value to be encoded). The original value is used as a pointer to the table. The length of the replacement values can be the same but it is possible to use more replacement values in such areas where the most of the original pixel values are than in areas where there are only a few original values. Another alternative is that dark values are quantized less wherein more replacement values are available for the dark values and bright values are quantized more (e.g. an A-law LUT table).

It is also possible that the original values are quantized differently by using an equation instead of LUT. For example, piece-wise different quantization values from 8 to 7 bits could be based on the following choice of quantization values:

for original values between 0 to 63 the quantizer Q=1 which means that the original value would be retained;
for original values between 64 and 143 the quantizer Q=2 meaning that the replacement values are from 64 to 103;
for original values from 144 to 223 the quantizer Q=4 and the replacement values are from 104 to 123; and
for original values from 224 to 255 the quantizer Q=8 and the replacement values are from 124 to 127.

If there is need to rotate an image (e.g. 90 degrees) the rotation may require a lot of memory. Sometimes it is better to process an image block by block instead of line by line. If an image is to be processed as vertical slices, the image has to be decoded as many times as there are slices if storing of decoded image frame should be avoided.

SUMMARY OF THE INVENTION

According to teachings of the present invention an image is divided to blocks wherein encoding of the pixels of the image can be performed in a block-by-block manner. The size of each block of the image need not be the same. Further, the blocks need not have equal number of rows and columns i.e. the size of the blocks need not be the same for horizontal and vertical direction.

It is also possible that the image needs to be processed as blocks and so the line structure is not the best possible. Line structure can also be difficult if the image needs to be rotated (or cropped) before the image processing. So by using the present invention it is possible to use a block structure and create synchronization points and a predictor suitable for it.

According to a first aspect of the invention there is provided an apparatus for encoding an image comprising a pixel matrix, said pixels comprising a first number of bits, the apparatus comprising:

a determining element for defining two or more blocks of pixels from the pixel matrix;
an encoding element configured to process the pixels of one block at a time to form encoded pixel values comprising a certain second number of bits; and
a bit string composer for forming bit strings on the basis of the encoded pixels.

According to a second aspect of the invention there is provided an apparatus for decoding an image on the basis of encoded pixel values of blocks of a pixel matrix of the image, said pixel matrix comprising pixels having a first number of bits and said encoded pixel values comprising a certain second number of bits, the apparatus comprising:

a determining element for recovering the block structure of the image;
a bit string decomposer for retrieving pixel information from the bit strings; and
a decoding element configured to process the retrieved pixel information of one block at a time to restore the original number of bits of the pixels.

According to a third aspect of the invention there is provided a module for encoding an image comprising a pixel matrix, said pixels comprising a first number of bits, the module comprising:

a determining element for defining two or more blocks of pixels from the pixel matrix; and
an encoding element configured to process the pixels of one block at a time to form encoded pixel values comprising a certain second number of bits.

According to a fourth aspect of the invention there is provided a module for decoding an image on the basis of encoded pixel values of blocks of a pixel matrix of the image, said pixel matrix comprising pixels having a first number of bits and said encoded pixel values comprising a certain second number of bits, the module comprising:

a determining element for recovering the block structure of the image; and
a decoding element configured to process the retrieved pixel information of one block at a time to restore the original number of bits of the pixels.

According to a fifth aspect of the invention there is provided a camera comprising:

an image sensor comprising a matrix of photosensitive elements for forming pixel information;
a determining element for defining two or more blocks of pixels from the image sensor;
a scanning element configured to scan the pixels of one block at a time.

According to a sixth aspect of the invention there is provided a method for encoding an image comprising a pixel matrix, said pixels comprising a first number of bits, the method comprising:

defining two or more blocks of pixels from the pixel matrix;
processing the pixels of one block at a time to form encoded pixel values comprising a certain second number of bits; and
forming bit strings on the basis of the encoded pixels.

According to a seventh aspect of the invention there is provided a method for decoding an image comprising encoded pixel values of blocks of a pixel matrix of the image, said pixel matrix comprising pixels having a first number of bits and said encoded pixel values comprising a certain second number of bits, the method comprising:

recovering the block structure of the image;
retrieving pixel information from the bit strings; and
processing the retrieved pixel information of one block at a time to restore the original number of bits of the pixels.

According to an eighth aspect of the invention there is provided a computer readable medium storing a computer program for encoding an image comprising a pixel matrix, said pixels comprising a first number of bits, the computer program comprising instructions for:

defining two or more blocks of pixels from the pixel matrix;
processing the pixels of one block at a time to form encoded pixel values comprising a certain second number of bits; and
forming bit strings on the basis of the encoded pixels.

According to a ninth aspect of the invention there is provided a computer readable medium storing a computer program for decoding an image, which image comprises encoded pixel values of blocks of a pixel matrix of the image, said pixel matrix comprising pixels having a first number of bits and said encoded pixel values comprising a certain second number of bits, the computer program comprising instructions for:
recovering the block structure of the image;
retrieving pixel information from the bit strings; and
processing the retrieved pixel information of one block at a time to restore the original number of bits of the pixels.

According to a tenth aspect of the invention there is provided a bit stream comprising encoded pixels of an image, which image comprises a pixel matrix, said pixels comprising a first number of bits, and said image having been divided into blocks, the bit stream comprising:
a bit string for each pixel of the pixel matrix; said bit string comprising a value field containing an encoded pixel value comprising a certain second number of bits indicative of the pixel value; and
said bit stream comprises bit strings of one block successively.

According to an eleventh aspect of the invention, a wireless communication device is provided comprising
a determining element for defining two or more blocks of pixels from a pixel matrix, said pixels comprising a first number of bits;
an encoding element configured to process the pixels of one block at a time to form encoded pixel values comprising a certain second number of bits; and
a bit string composer for forming bit strings on the basis of the encoded pixel values.

According to a twelfth aspect of the invention, a wireless communication device is provided comprising
a determining element for recovering a block structure of an image on the basis of encoded pixel values of blocks of a pixel matrix of the image, said pixel matrix comprising pixels having a first number of bits and said encoded pixel values comprising a certain second number of bits;
a bit string decomposer for retrieving pixel information from the bit strings; and
a decoding element configured to process the retrieved pixel information of one block at a time to restore the original number of bits of the pixels.

When using embodiments of the invention the Image quality can remain good in spite of compression. Rotation of the image can also be supported as well as cropping of the image. Images can be divided into blocks in different ways and each block can be processed independently of the other blocks. When pixel information of one block is delivered to the decoding apparatus successively, the decoding apparatus can begin the decoding of one block without a need to wait for the reception of pixel information of other blocks. In connection with the invention a multiplicity of encoding/decoding methods can be used.

DESCRIPTION OF THE DRAWINGS

FIG. 2a shows an example of a filter arrangement for pixels of an image to produce signals for different color components,
FIG. 2b shows another example of a filter arrangement for pixels of an image to produce signals for different color components,
FIG. 2c shows an example of a filter arrangement for pixels of an image to produce signals for different color components,
FIG. 2d shows another example of a filter arrangement for pixels of an image to produce signals for different color components,
FIG. 3a shows an example of encoding and decoding apparatuses according to the invention,
FIG. 3b shows in a simplified way the arrangement of photosensitive elements of an image sensor,
FIG. 5a depicts an example of a beginning of a bit stream encoded according to an example embodiment of the invention,
and
FIG. 5b depicts another example of a beginning of a bit stream encoded according to an example embodiment of the invention.

DETAILED DESCRIPTION OF EMBODIMENTS OF THE INVENTION

In the more detailed description of the invention, the following variables will be used:

| | |
|---|---|
| Xorig | to determine the original pixel value (e.g. 10 bits), |
| Xpred | to determine the predicted pixel value, |
| Xdiff | to determine the difference between the original and predicted values (Xorig − Xpred), |
| Xenco | to determine the encoded pixel value (e.g. 8 bits), |
| Xdeco | to determine the decoded pixel value, |
| decodedXorig | to determine the decoded original pixel value, and |
| decodedXdiff | to determine the decoded difference between the original and predicted values. |

Figures 1A, 1B:
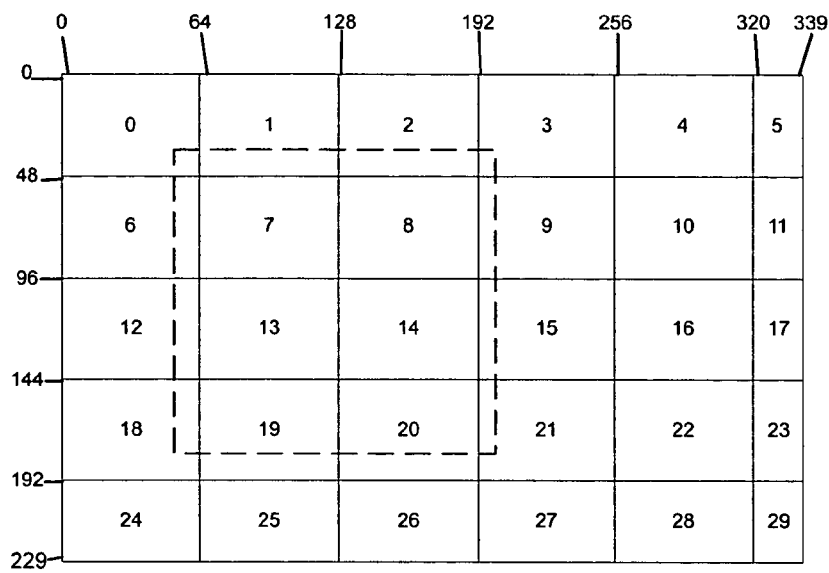
FIG. 1a shows an example arrangement of blocks of an image and their numbers.
FIG. 1b shows the blocks of the image of FIG. 1a after 90 degrees rotation to the right.

FIG. 1a shows one example arrangement of an image which is divided into blocks. In this example the image size is 340×230 pixels. In other words, there are 230 rows and 340 columns of pixels. The image is divided into blocks of the size 64×48 pixels. However, all the blocks are not of the same size but there are also blocks of 20×48 pixels, blocks of 64×38 pixels, and a block of 20×38 pixels. For clarity, the blocks are consecutively numbered from 0 to 29 in the figures. The block on the upper left corner has the number 0, the block on the upper right corner has the number 5, and so on to the block on the lower right corner in which has the number 29. FIG. 1a also depicts the row numbers 0-229 and column numbers 0-339. It should be understood that these numbers are just non-limiting examples but also different blocking scheme and different sized images can be used. For example, the image of 640×480 pixels could be divided into blocks of 64×48 pixels, into 32×24 pixels, into 16×16 pixels or into 8×8 pixels. As a further example the image of FIG. 1a could be divided into e.g. 170 blocks of 32×32 pixels, 17 blocks of 20×32 pixels, 10 blocks of 32×8 pixels and a block of 20×8 pixels.

In FIG. 2a an example of a filter array 1.3 for the pixels of the image is depicted. Only a portion of the array is shown for clarity, but the same pattern is usually repeated throughout the whole area of the image. The filter array has filtering elements for red, green and blue color arranged in the optical path of photosensitive elements of an image sensor 1.2. This means that light radiation from an imaging optics 1.1 of a camera 1 (FIG. 3a) passes through these filtering elements and impinges on the photosensitive elements of the image sensor 1.2. In the example arrangement of FIG. 2a the Bayer matrix arrangement is used. Therefore, the first row (line) of pixels has filter components for green and red color, the second row of pixels has filter components for blue and green color, the third row of pixels has filter components for green and red color, etc. Therefore, the first photosensitive element of the first row receives mainly radiation at the wavelength corresponding to green light, the second photosensitive element of the first row receives mainly radiation at the wavelength corresponding to red light, etc. This kind of color scheme has also been marked as RGrGbB indicating that there is one green component Gr on the same line with the red color and one green component Gb on the same line with the blue color.

In FIG. 2b another example of a filter array for the pixels of the image is depicted. The filter array has filtering elements for red, green and blue color arranged in the optical path of the photosensitive elements. In the example arrangement of FIG. 2b there is equal number of filter components for red, green and blue color in each row. Also other arrangements of the filter components than presented above can be used. There are also different techniques to implement the filter array so that the desired filtering arrangement can be achieved. For example, it is also possible to use a stacked-filter design in which each pixel is made up of e.g. three photosensitive elements (e.g. red, green, blue) stacked above each other. The top-most photosensitive element is sensitive to one color, e.g. blue filtering blue radiation and passing other wavelengths through the photosensitive element, the next photosensitive element is sensitive to another color, e.g. green filtering green radiation and passing other wavelengths through the photosensitive element, and the photosensitive element at the bottom is sensitive to the third color, e.g. red filtering red radiation.

Next, the operation of an example encoding/decoding methods of the present invention will be described in more detail with reference to the apparatuses of FIG. 3a. The system of FIG. 3a comprises devices 2 and 30 which implement the encoding (Enc)/decoding (Dec) according to the invention, respectively. The devices 2, 30 can be placed physically separately in the system. The devices 2, 30 can also be implemented as a single apparatus, i.e., a single physical unit. Arrangements of the described type, combining DPCM and PCM modulation or using smart DPCM modulation, can thus be implemented as part of the electronic device, for example in a digital signal processing unit (DSP) in a camera or the like. Typically, the electronic device also comprises other functions, such as a display 34 for displaying image information to the user and a processor for controlling the electronic device. A digital camera 1 comprising an image processing system according to the invention can be implemented in connection with a mobile device, either as a separate unit or integrated in the device, which mobile device also comprises means for mobile communication. Furthermore, the digital camera comprising the image processing system according to the invention may be connected to a communication network (e.g. the Internet), to operate as a WebCam, for example. The whole invention can be implemented by using hardware arrangements, a microcodable processor, or alternatively by computer soft-ware alone. All combinations of these are also possible. Consequently, the invention can typically also be used as a part of larger software, it can be constructed as part of a separate encoding circuit, or it can be implemented in connection with a camera module to be retailed separately.

An image is taken by the camera 1 wherein the image sensor 1.2 produces a signal based on information produced by the photosensitive elements 1.2.1 (FIG. 3b) of the image sensor 1.2. For example, when using the filter array of FIG. 2a the first photosensitive element in the first row receives radiation at the wave length of green light, the second photosensitive element in the first row receives radiation at the wave length of red light, etc. Signals produced by the photosensitive elements of the image sensor 1.2 are digitized by an analog-to-digital converter 3. The signal produced by the first photosensitive elements of the image sensor 1.2 represents the value of the first pixel i.e. a value indicative of the intensity of the radiation which passed through the first filtering element to the first photosensitive element. The analog-to-digital converter 3 converts the analog values to digital values. In the following, the digitized values of the signals from the photosensitive elements will be called pixel values. The analog-to-digital converter 3 may be inside of the camera 1 or external to the camera 1, for example in the device 2. Similarly, the device 2 may itself be part of the camera 1 or mobile device.

The scanning order of the photosensitive elements 1.2.1 of the image sensor 1.2 of the camera 1 can also be block-by-block, wherein all pixel values of the same block can be processed and converted to digital values successively. If, however, a line-by-line scanning order is used, a line memory (or a column memory if column-by-column scanning order is used) is needed to temporarily store pixel values of one or more line (columns) before pixel values of one block have been scanned (read) and digitized for the block-by-block processing.

In an example embodiment the scanning order of the photosensitive elements 1.2.1 of the image sensor 1.2 of the camera 1 can be controlled by sending (line 1.6 in FIG. 3a) or inputting parameter(s) to the camera which indicate the block structure and/or the scanning principle to be used (block-by-block, line-by-line, column-by-column). The camera 1 may comprise a processor 1.4 to control the operation of the camera and process pixel information, if needed, before transmitting the pixel information to e.g. the encoding apparatus 2. The camera 1 may also comprise an input/output block 1.5 providing an interface for connecting the camera 1 to other devices. The interface may be a wired and/or a wireless interface.

The pixel values are transferred to a processing element 4 of the device 2, which receives the pixel values and stores them into a memory 5. There may be a certain area in the memory 5 reserved for image data i.e. pixel values of the image and/or for encoded image data.

When the image needs to be compressed, for example for transmission from the device 2 to another device 30 through a communication channel e.g. by the transmitter 6, for storing with reduced number of bits into the memory 5 or into another storage element such as a memory card 8 connected to a memory card interface 7 of the device 2, the compression is performed on a block-by-block basis.

According to a first example embodiment the compression is performed in such a way that the image is processed in a block-by-block basis. It means that the image is divided into blocks. However, the division need not be a separate act performed each time the compression is conducted but there may be some parameters defined which indicate the block structure of the image. Then the processing element 4 can use these parameters to determine which pixels belong to which block. As an example, there can be parameters indicative of the row and column numbers at which a new block begins. In the block structure of FIG. 1a, the second block (numbered as 1) begins at row 0, column 64. It is also possible to determine the parameters in such a way that they directly indicate memory addresses of the storage locations of e.g. the first pixel of each block.

It is also possible to implement the invention in such a way that the block structure varies wherein different parameters may be needed. The selection of the block structure to be used may be based on e.g. properties of the image, the operation to be performed to the image, etc.

EXAMPLE 1

Figures 3C, 3D:
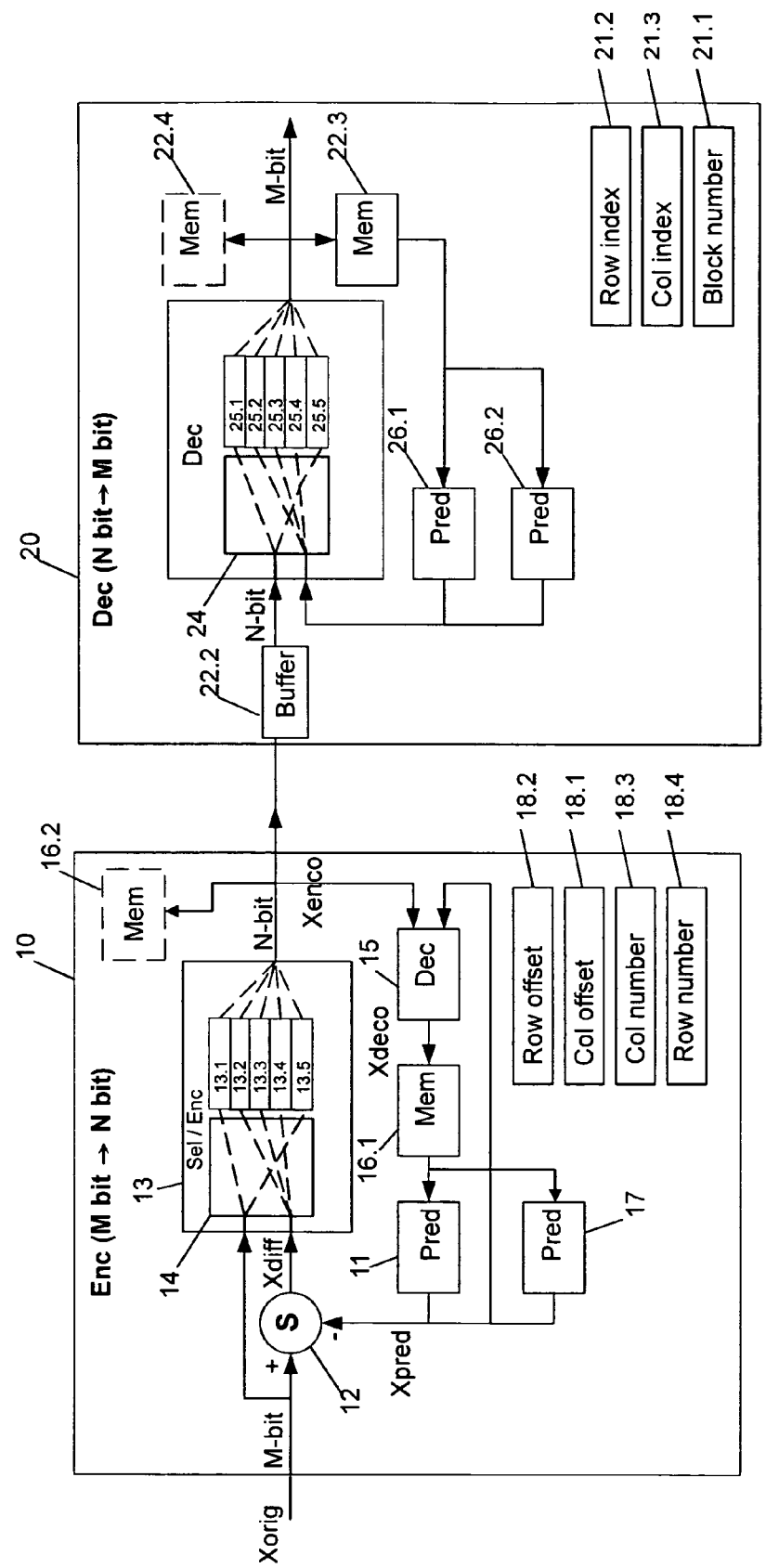
FIG. 3c shows an example of an encoding apparatus according to the invention.
FIG. 3d shows an example of a decoding apparatus according to the invention.
Figure 4:
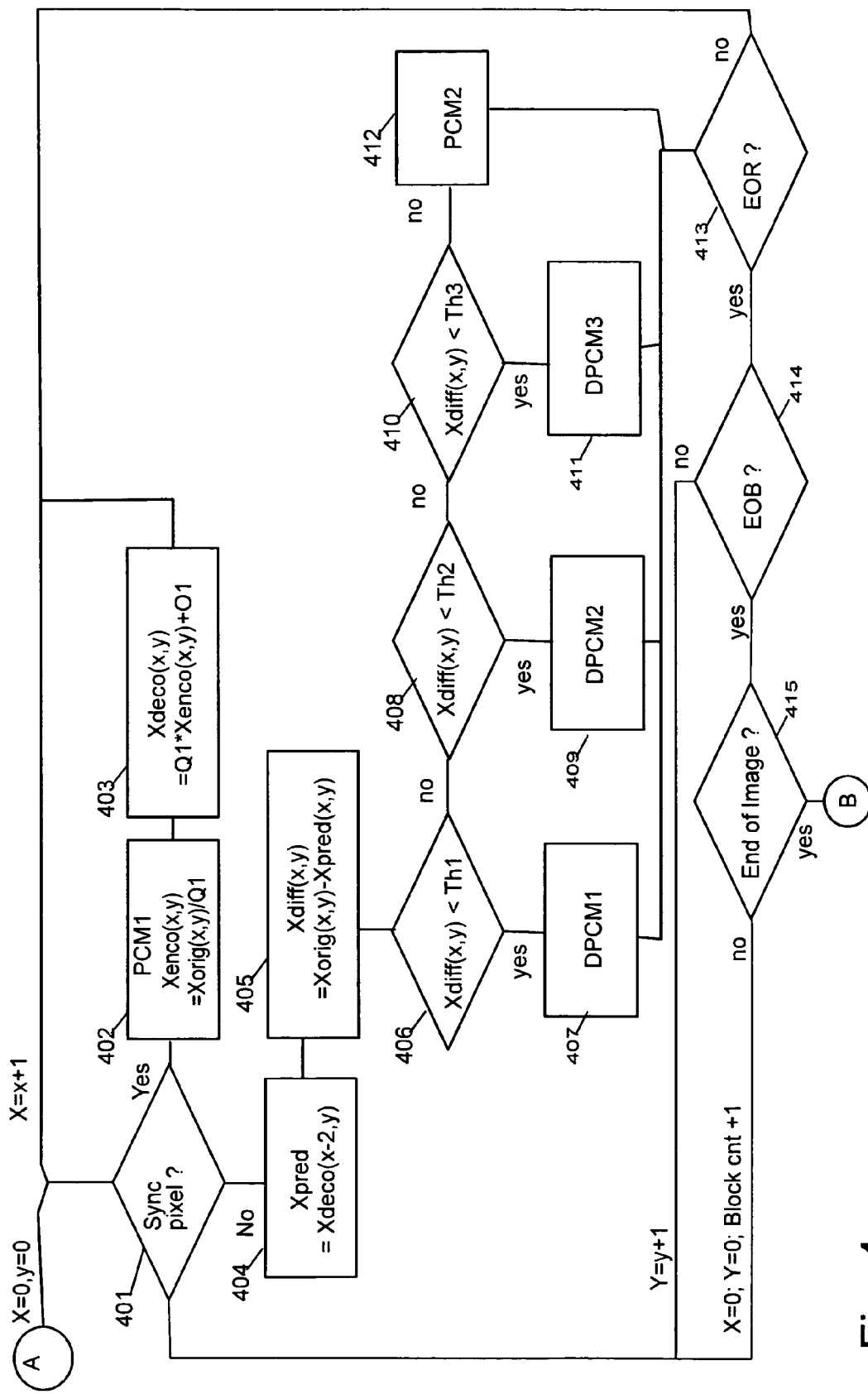
FIG. 4 shows a flow chart of the operation of the encoder according to a first example embodiment of the invention.

Next, the encoding of the image in an encoding apparatus 10 of FIG. 3c will be disclosed using the Bayer image format shown in FIGS. 2a and 2c as an example of the filter array. In FIG. 4 the encoding method according to an example embodiment is depicted as a flow diagram. It is assumed that the original pixel values are 10 bits width and the purpose of the encoding is to reduce the bit width to 8 bits. However, these values are just non-limiting examples and also other values can be used instead (from 10 bits to 7 bits, from 12 bits to 8 bits, from 16 bits to 12 bits, etc.). In FIG. 2c pixels of one block of the image are shown. In the non-limiting example of FIG. 2c, the block has 12 rows and 16 columns. Letters R represent red pixels, letters G represent green pixels, and letters B represent blue pixels. For clarity, FIG. 2d shows the block of FIG. 2c without the letters R, G and B. For encoding the blocks of the image one or more synchronizing points (synchronizing pixels) are used as starting points for the encoding. It is assumed here that the selection of the synchronizing point is similar for each block in the image. For example, the pixel at the upper left corner of each block, i.e. the first pixel of the first (uppermost) row of the block, marked with reference P(0,0) in FIGS. 2c and 2d, can be used as the starting point for the first color (e.g. green) for the first row, the second pixel P(1,0) at the first row of the block can be used as the starting point for the second color (e.g. red), the first pixel P(0,1) at the second row of the block can be used as the starting point of the third color (e.g. blue), and the second pixel P(1,1) at the second row of the block can be used as the starting point for the first color for the remaining rows. The synchronizing pixels are not predicted but they are encoded without using any information from other pixels of the block.

In this example embodiment the encoder 13 comprises a selector 14 which uses information on the row index y, column index x and/or the absolute value of a prediction error as a signal on the basis of which the selector 14 selects an encoding method for the current pixel. The encoder 13 can also comprise an encoding element 13.1-13.5 for each selectable encoding method, or the encoding method can be selected by selecting appropriate parameters for the encoder 13.

In the example encoding method the row index y and the column index x are initialized to zero (x=0, y=0). The selector 14 determines whether the pixel to be encoded is a synchronizing pixel (block 401 in the flow diagram of FIG. 4). The determination can be performed on the basis of the indices x, y i.e. the value of the column index x and the value of the row index y are examined. If both the column index x and the row index y are less than 2 (P(0,0), P(1,0), (P(0,1) or P(1,1)), it means that the pixel P(x, y) is a synchronizing pixel. The selector 14 passes the value of the synchronizing pixel to a first encoding block 13.1 which in this embodiment quantizes the pixel value by dividing the pixel value by a first quantizing value Q1 (block 402). In this example embodiment the first quantizing value is 4 to reduce the bit width from 10 bits to 8 bits (block 402). This can be represented with the formula Xenco(x, y)=Xorig(x, y)/Q1. The decoding element 15 of the encoding apparatus calculates a decoded value Xdeco(x, y)=Q1*Xenco(x, y)+O1, in which O1 is an offset value which can be added to the result of the multiplication for rounding (block 403). The decoded value will be stored to the decoded pixel memory 16.1. The column index will be increased by one (x=x+1). By this way the synchronizing values of the first (x=0) and second color (x=1) have been obtained. The row index remains the same (y=0) to the end of the first row of the block.

If it is determined in block 401 that the pixel is not a synchronizing pixel i.e. the row index y or the column index x is greater or equal than 2, a predicted pixel value will be calculated in a first predictor 11 (block 404) based on the previous decoded value of the same color (Xpred(x, y)=Xdeco(x−2, y)). The predictor 11 retrieves the decoded value of the reference pixel Xdeco(x−2, y) from the decoded pixel memory 16.1 and passes it to a summing element 12. The summing element 12 calculates the difference between the original value and the predicted value to obtain the prediction error Xdiff(x, y)=Xorig(x, y)−Xpred(x, y) for the predicted pixel value (block 405). The output of the summing element 12 i.e. the prediction error signal Xdiff(x,y) is input to the encoder 13.

As was mentioned above, the absolute value of the prediction error may affect the encoding method to be used in encoding the prediction error value. Hence, the selector 14 uses the absolute value of the prediction error as a signal on the basis of which the selector 14 selects (blocks 406, 408, 410) an encoding method for the predicted pixels. In an example embodiment the encoding method is selected from a set of encoding methods depending on how large is the absolute value of the prediction error Xdiff. For example, if the absolute value of the prediction error Xdiff is less than a first threshold value TH1 (e.g. 32), a second encoding element 13.2 implementing a second encoding method such as a differential pulse code modulation DPCM1 can be used (block 407), else if the absolute value of the prediction error Xdiff is greater or equal than the first threshold value but less than a second threshold value TH2 (e.g. 64), a third encoding element 13.3 implementing a third encoding method such as a second differential pulse code modulation DPCM2 can be used (block 409), else if the absolute value of the prediction error Xdiff is greater or equal than the second threshold value TH2 but less than a third threshold value TH3 (e.g. 128), a fourth encoding element 13.4 implementing a fourth encoding method such as a third differential pulse code modulation DPCM3 can be used (block 411), else if the absolute value of the prediction error Xdiff is greater or equal than the third threshold value TH3 a fifth encoding element 13.5 implementing a fifth encoding method such as a pulse code modulation can be used (block 412).

When one of the predictive encoding methods (the second, third, or fourth encoding method) is selected, the selector 14 passes the difference value to the selected encoding element 13.2-13.4 of the encoder to encode the prediction error. The encoded prediction error is output from the encoder 13 and also input to the decoding element 15 of the encoding apparatus. The decoding element 15 uses the encoded prediction error and the predicted value from the predictor 11 to form a decoded pixel value and stores it into the decoded pixel memory 16.1. The calculation of the decoded pixel value depends on the selected encoding method and will be explained later in this specification.

When the fifth encoding method is selected, the selector 14 passes the original value to the fifth encoding element 13.5 of the encoder to encode the original pixel value. The encoded pixel value is output from the encoder 13 and also input to the decoding element 15 of the encoding apparatus. The decoding element 15 uses the encoded pixel value and calculates the decoded pixel value and stores it into the decoded pixel memory 16.1.

The encoded prediction errors and encoded pixel values can be stored into an encoded pixel memory 16.2 and/or transmitted to e.g. a device 30 (see e.g. FIG. 6) comprising a decoding apparatus 20 (FIG. 3*d*).

Predicted values will be calculated to all remaining pixel values of the first row of the block. Then, after the prediction value of the last pixel of the first row (end of row, EOR) (block 413) has been calculated, the row index y will be increased by one (y=y+1) and the column index x will be set to the initial value (x=0). The first pixel value of the second row (P(0,1)) was selected as the synchronization value for the third color. Therefore, the first pixel value of the second row (P(0,1)) will be quantized by dividing the pixel value by the quantizing value Q1. Respectively, the second pixel value of the second row P(1,1) is the synchronization value for the first color G although a synchronization value for the first color on the first row has already been selected. This is due to the fact that in Bayer image format even numbered pixels of even numbered rows (i.e. the second, fourth, sixth etc. pixel on the second, fourth, sixth etc. row) are of the same color than the odd numbered pixels of the odd numbered rows (i.e. the first, third, fifth etc. pixel on the first, third, fifth etc. row).

The other pixels of the second row will be predicted using the same principle which was used in the prediction of the pixel values of the first row. Again, when all predicted pixel values and prediction errors for the pixels of the second row have been calculated and encoded pixel values have been formed, the row index y will be increased by one and the column index x will be set to the initial value.

Synchronization values have not been selected for the third row. Hence, all pixels of the third row will be encoded by forming a predicted pixel value and a prediction error. The prediction of the first pixel value of the third row uses the first synchronization value as the prediction value because the first synchronization value (i.e. the first pixel of the first row) is of the same color as the first pixel of the third row. The prediction value is obtained by a second predictor 17 which retrieves the first synchronization value from the decoded pixel memory 16.1 and uses it as the predicted value for the current pixel. The predicted value is input to the summing element 12 which calculates the difference between the original pixel value of the current pixel and the predicted pixel value. The difference value is input to the encoder 13 to be used in the selection of the encoding method. The selection can be based on similar principles as presented above in connection with prediction of the pixel values of one row. Therefore, the same selector 14 and encoding elements 13.2-13.5 can be used.

The second pixel value of the third row is of different color than the first pixel value of the third row. Therefore, a pixel value of the same color and on the same column will be used as a prediction value for the second pixel value of the third row. In this example embodiment the second value of the first row is of the same color, as can be seen from FIG. 2*c*. Therefore, the second predictor retrieves the decoded pixel value of the second pixel of the first row (P(0,1)) from the decoded pixel memory 16.1 and transfers the retrieved value to the summing element 12. The summing element 12 calculates the prediction error as disclosed above and the selector 14 selects the appropriate encoding method. The prediction error is encoded, the decoded value is calculated and stored into the decoded pixel memory 16.1.

The calculation of the prediction values of the other pixels of the third row follows similar principle as the calculation of the prediction values of the pixels of the first and the second row. The first two pixel values are predicted on the basis of a decoded pixel value of a previous row having the pixel of the same color in the same column (i.e. Xdeco(x, y−2)), and the other pixels of each subsequent row to the end of the block (EOB) (block 412) are predicted on the basis of previous pixel values of the same color on the same row.

In this example embodiment the second, third and fourth encoding methods encode the difference value while the first and fifth encoding method encodes the optionally quantized, original pixel value. Therefore, the operation of the encoder can be presented as the following pseudo code when fixed length code words are used:

```
PCM1:
if P(x,y) is a synchronization pixel, then
        Xenco(x,y) = "xxxxxxxx"
        Xdeco(x,y) = Q1*value+O1
        decodedXorig(x,y) = Q1*value+O1
            in which Q1 = 4 representing the first quantizing value;"xxxxxxxx"
            indicates the quantized value = Xorig(x,y)/Q1; and O1 is the
            optional offset value (e.g. 2). For example, when Xorig(x,y) =
            120, 121, ..., 123, then the coded value Xenco(x,y) = 00011110,
            and Xdeco(x,y) = 4*value+2 = 122. The values Xenco(x,y) and
            Xdeco(x,y) will be calculated by the encoding apparatus whereas
            the value decodedXorig(x,y) is calculated by the decoding
            apparatus as will be explained later in this description.
DPCM1:
else if abs(Xdiff(x,y)) < TH1, then
        Xenco(x,y) = "00 s xxxxx"
        Xdeco(x,y) = Xpred(x,y)+sign*value
        decodedXdiff(x,y) = sign*value
            in which TH1 = 32, 00 is the code word, s represents the sign,
            and "xxxxx" indicates, in five bits, the value = abs(Xdiff(x,y))/Q2,
            the quantizing value Q2 being 1. For example, when Xdiff(x,y) =
            −9, the coded value Xenco(x,y) = "00 1 01001", and
            decodedXdiff(x,y) = sign*value = −9. The value decodedXdiff(x,y)
            is calculated by the decoding apparatus.
```

-continued

```
DPCM2:
else if abs(Xdiff(x,y)) < TH2, then
    Xenco(x,y) = "010 s xxxx"
    Xdeco(x,y) = Xpred(x,y)+sign*(TH1+Q3*value)
    decodedXdiff(x,y) = sign*( TH1+Q3*value)
        in which TH1 = 32, TH2 = 64, 010 is the code word, s represents
        the sign, and "xxxx" indicates, in four bits, the value =
        (abs(Xdiff(x,y))–TH1) / Q3, the quantizing value Q3 being 2. For
        example, when Xdiff(x,y) = 54 or 55, then the coded value
        Xenco(x,y) = 010 0 1011, and decodedXdiff(x,y) =
        sign*(32+2*value) = 54).
DPCM3:
else if abs(Xdiff(x,y)) < TH3, then
    Xenco(x,y) = "011 s xxxx"
    Xdeco(x,y) = Xpred(x,y)+sign*( TH2+Q4*value+O2)
    decodedXdiff(x,y) = sign*( TH2+Q4*value+O2)
    if Xdeco(x,y) > 1023,       then Xdeco(x,y) = 1023
    else if Xdeco(x,y) < 0,     then Xdeco(x,y) = 0
        in which TH2 = 64, TH3 = 128, 011 represents the beginning of
        the code word, s represents the sign, and "xxxx" indicates, in
        four bits, the value = (abs(Xdiff(x,y)) – TH2)/Q4, the quantizing
        value Q4 being 4. For example, when Xdiff(x,y) = –123, –122,
        –121, or –120, then the coded value Xenco(x,y) = 011 1 1110,
        and decodedXdiff(x,y) = sign*(64+4*value+1) = –121.
PCM2:
else if abs(Xdiff(x,y)) >= TH3, then
    Xenco(x,y) = "1 xxxxxxx"
    Xdeco(x,y) = (Q1*value+O1)
    decodedXdiff(x,y) = (Q1*value+O1)
        in which TH3 = 128, 1 represents the beginning of the code
        word, and "xxxxxxx" indicates, in seven bits, the value =
        Xorig(x,y)/Q1, the quantizing value Q1 being 8. For example,
        when Xdiff(x,y) = 520 – 527, then the encoded bit string is
        "1 1000001" and Xdeco(x,y) = decodedXdiff(x,y) = 8*value+4 =
        524.
```

The threshold values TH1, TH2, TH3 and encoding methods PCM1, PCM2, DPCM1, DPCM2, DPCM3 are just examples of a possible selection of threshold values and encoding methods but it should be evident that also other threshold values and encoding methods may be used with the invention. For example, encoding based on look-up-tables or a simple quantizer can also be used. It is also possible that the number of threshold values and selectable encoding methods can be different from what is presented above. It is also obvious that the first and second pulse code modulation methods can also be the same wherein only one pulse code modulator is needed.

Although in the disclosure above the prediction of the first and the second pixel of the third row was performed by the second predictor 17 it should be evident that the first predictor 11 can be used in forming all predicted values wherein the second predictor 17 is not needed.

EXAMPLE 2

In the second example embodiment a synchronization value is selected for each row of each block of the image. Hence, the first two pixel values of each row are used as synchronization values and the other pixels of the same row are predicted using the previous pixel values of the same row. Thus, the second predictor 17 (i.e. for the prediction in the vertical direction) is not needed. Otherwise the operation follows the principles presented above.

The decision whether to use only one starting point for each block or to use one starting point for each row of each block may be based on the features of these alternatives. If one starting point is used the encoding/decoding efficiency can be increased compared to the usage of multiple starting points, but if multiple starting points are used the robustness of the encoding/decoding apparatus can be increased compared to the usage of one starting point only.

In the above it was assumed that the first predictor 11 and the second predictor 17 need only one synchronization point. Therefore, 2×2 synchronization pixels were needed for each block when only one starting point was used, or 2 synchronization pixels were needed for each row of each block when one starting point at each row was used. The invention can also be implemented by using predictors which use more than one synchronization pixel. For example, two pixel values of the same color could be used as synchronization pixels for the predictors 11, 17.

It should also be noted that if all pixel values of the block to be encoded are stored into an image memory 16.3 (see FIG. 3a) before the encoding is performed, the synchronization values can differ from that presented above and also the process may proceed in a vertical direction (column-by-column) instead of the horizontal direction (row-by-row). The encoding may also proceed from right to left or from bottom to up.

In the above an example method of the invention the encoding of one block of the image was disclosed. All the blocks of the image can be encoded by using the same method. However, if the blocks of the image to be encoded are retrieved from the image memory 16.3 by the encoding apparatus 10, or if the encoding apparatus 10 does not receive the pixels of the image block-by-block, the encoding apparatus 10 should somehow keep track of the blocks which have already been encoded and which block to encode next, and/or to determine whether all blocks of the image have been encoded or not (block 415). The encoding apparatus 10 may have a block counter which is e.g. incremented by one when one block has been encoded and/or the encoding apparatus 10 may have a row offset counter 18.2 and a column offset counter 18.1 to indicate to which block each pixel belongs to. For example, in the example image of FIG. 1a the block number 7 begins at the 48:th row and the 64:th column. Therefore, when the eighth block of the image is to be encoded and pixel values of that block will be retrieved from the image memory 16.3, the encoding apparatus 10 sets the column offset counter 18.1 and the row offset counter 18.2 to a value corresponding the location of the first pixel on the first row of the eighth block, for example the column offset counter 18.1 will be set to 64 and the row offset counter 18.2 will be set to 48. The encoding apparatus 10 retrieves the pixels to be encoded from the image memory 16.3 using the column offset counter 18.1, the row offset counter 18.2, the column counter 18.3, and the row counter 18.4 to form a correct address for addressing the current pixel value in the image memory 16.3. It should be evident that in practical implementations the image memory 16.3 may not start from address 0 in the memory 16 of the encoding apparatus so in addition to the above mentioned counters the real starting address of the image in the memory 16 may also be needed, which is known as such.

In another embodiment the encoding apparatus 10 receives the image block-by-block in such a manner that after receiving all pixels of one block the encoding apparatus 10 encodes the pixels of the block and sends the bit strings of the encoded pixel values to another device and/or stores them into the encoded image memory 16.2. After that, the next block is received and encoded. In this embodiment the encoding apparatus 10 comprises an image block memory 16.4 to which the received pixel values of the block will be stored for processing.

In yet another embodiment the pixel values are received one by one, and the encoding apparatus 10 performs the encoding of the pixel value before receiving the next pixel value. The pixel values are received in such a manner that pixel values of one block of the image are received first, after that pixel values of another block of the image are received, etc.

Because of the block structure some visible block boundaries may appear because of coarse quantization of synchronization values. For that reason there could be a possibility to define the amount of bits used in those synchronization (not predicted) pixel values. It can be e.g. the original bit width, for example 16, 14, 12, 10, 8 bits, or it can be a compressed bit width. In some implementations it is beneficial to have e.g. 8 or 12 bit values for the synchronization values so that those synchronization pixel values can be sent as 2 or 3 bytes (8-bits/byte). It can also be beneficial to select so high amount of bits that no visible quantization errors should occur.

The basic idea of the above disclosed usage of a set of selectable coding methods is that if the prediction is sufficiently good, that is, the difference between the original and predicted pixel values is smaller than a predetermined limit value (abs(Xdiff)<Lim), the difference value is transferred, in quantized format, to the DPCM codec. Otherwise, the original value is transferred, in quantized format, to the PCM codec. Information about the selected codec is also transferred in connection with the values. In both methods, a fixed number (M) of bits is used to represent one pixel unless it is a synchronizing pixel. The bit number M is determined according to the capacity to be used. The code words for transmitting/storing the encoded values of the synchronization pixels can be equal to M or longer than M, if necessary.

Next, the forming of a bit string from the encoded pixel values will be explained. The encoded values are inserted into a bit string for transmission and/or storage. The bit string contains information on the selected encoding method and information on the encoded value. In this context the term bit string means a sequence of bits which contain information necessary to decode one pixel value. It should be evident that such bit strings can be concatenated to a set of bit strings to transmit and/or store the encoded data of all pixels of one or more images. When bits of such a set of bit strings are transferred it can also be called as a bit stream.

The encoded bit string comprises, for example in the beginning, a code word, from which the encoding method and, when applicable, magnitude of the change (difference between two neighboring pixels of the same color) can be determined. The code words can be, for example, 1, 00, 010, and 011. The first code word 1 indicates that the quantized value is encoded as such in the bit string whereas the other code words indicate that the code word includes information on the difference between the current pixel value and the previous pixel value of the same color. The second code word 00 further indicates that the magnitude of the difference is smaller than the first threshold TH1. The code word 010 further indicates that the magnitude of the difference is greater than or equal to the first threshold TH1 and smaller than the second threshold TH2. The code word 011 further indicates that the magnitude of the difference is greater than or equal to the second threshold TH2 and smaller than the third threshold TH3. The length of the code word corresponds to the lengths of Huffman code words, which are 1, 2, 3 and 3.

The code word with the length of one can also be called as an escape symbol indicating escape from the predictive encoding method. The escape symbol could also be "0" instead of "1". In this example the code word for the escape symbol is "1", because thereby the second smallest code word, having a length of 2, can be selected to be "00". As the reason for the choice can be given the fact that it is thus possible to avoid the complete code word "00000000" when the difference zero is transmitted as the value −0, that is, "00 1 00000". In this way, the complete code word "00000000" does not need to be avoided elsewhere, because the other code words contain at least one "1" in them. When the second code word is selected to be "00", the code word with the length of one must be "1" to make the decoding unambiguous. Because of the unambiguous decoding, the other two code words are thus "010" and "011". If the use of the complete code word "00000000" did not need to be avoided, the code words could naturally be also, for example, "0", "10", "110" and "111". It should be noted that sometimes there may also be a need to avoid other complete code words, such as, for example, "11111111", wherein there may be a need to change the code words. Consequently, the choice of the code words is not restricted to the code words mentioned in the description.

In addition to the code word, one bit can be reserved for the sign, because the change between the pixels may be negative. The sign may be located at the right side of the code word in the bit string, or at another place known both by the encoding apparatus 10 and the decoding apparatus 20. The remaining bits of the bit string give the change value in a binary representation.

Because the bit strings are fixed in length there is no need to define code words for the end of a row, the end of a block, and the end of the image. For example, the encoding apparatus 10 can use the value of the column counter 18.3 to determine the end of a row, the column counter 18.3 and the row counter 18.4 to determine the end of a block; and the column counter 18.3, the row counter 18.4, the row offset counter 18.2 and the column offset counter 18.1 to determine the end of the image. Respectively, the decoding apparatus 20 may comprise similar counters for the decoding process.

In an other alternative embodiment the length of bit strings of the encoded synchronization pixel values can be longer than the other bit strings. For example, the length of bit strings of the encoded synchronization pixel values can be 12 bits wherein two synchronizing pixel values can be transmitted in three 8-bit bytes, or 16 bits wherein two synchronizing pixel values can be transmitted in four 8-bit bytes, or even longer. The location of the bit strings of the encoded synchronization pixel values is usually in the beginning of the encoded pixel value of each block wherein the decoder can recognize these synchronization pixel values and decode them using the corresponding decoding method as will be explained below.

Figures 5A, 5B:
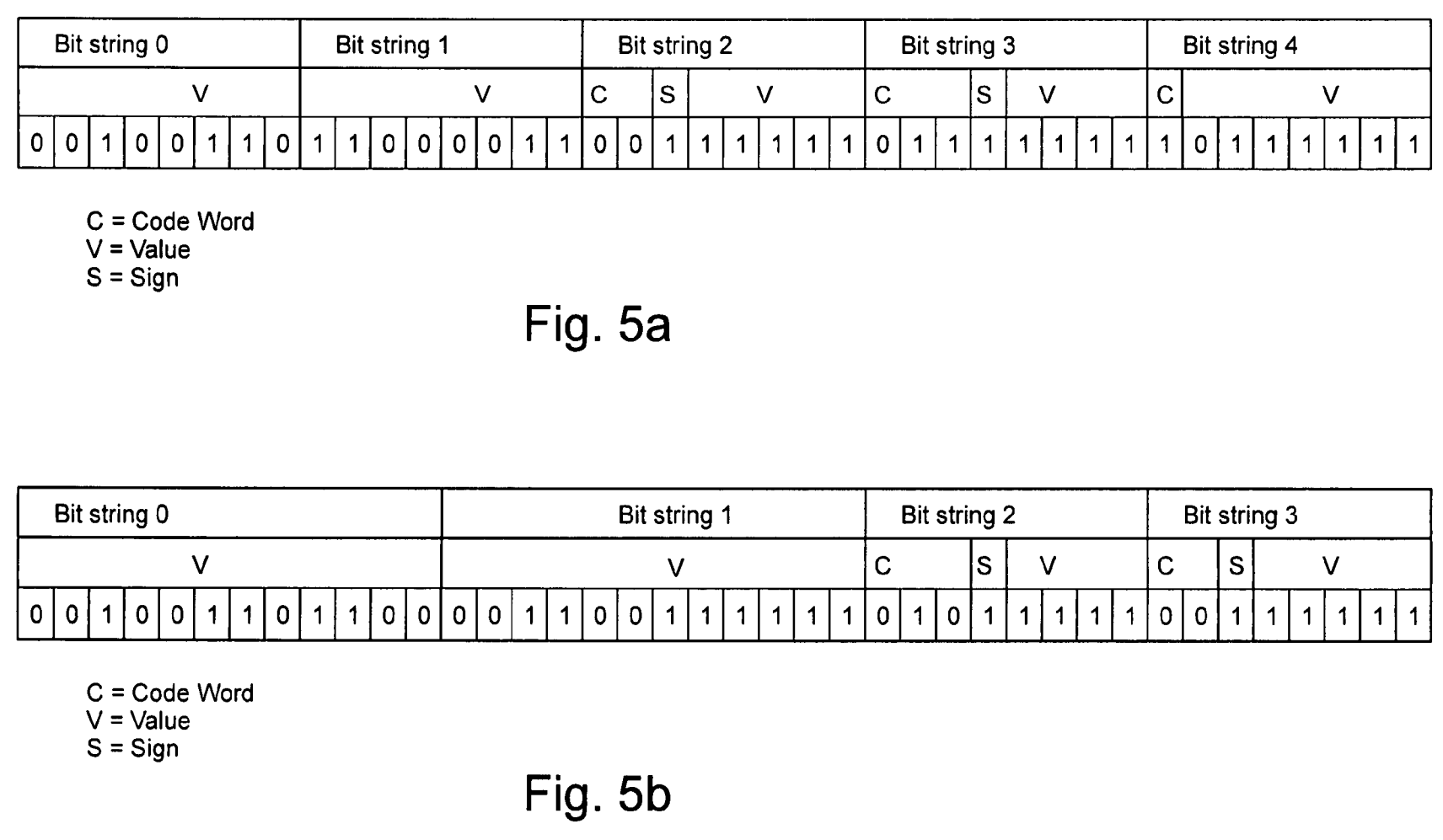

FIG. 5a depicts an example of a beginning of a bit stream which comprises bit strings of encoded pixel values having the same length. Correspondingly, FIG. 5b depicts an example of a beginning of a bit stream which comprises bit strings of encoded pixel values and in which the bit strings of the encoded synchronization pixel values are longer that bit strings of the encoded, predicted pixel values. In FIGS. 5a and 5b letters C indicates the code word, letters V indicates the value field, and letters S indicates the sign field. In an example embodiment of the present invention all bit strings of one block are included in the bit stream successively. Then the decoding apparatus can start the decoding of one block after all bit strings of the block have been received, or the decoding apparatus operates without a bit stream buffer and starts to decode the pixel after receiving a new bit string. In this embodiment it may not be necessary to store the received bit strings of other blocks if the decoding apparatus can decode the image fast enough before the bit strings of the following block are arriving to the decoding apparatus.

In the decoding process, in a corresponding manner, the decoding apparatus 20 (FIG. 3d) recognizes the code word e.g. at the beginning of the bit string, to select the method to be used for decoding the pixel value. In the decoding, the encoded synchronization pixel values are decoded without using information on other pixel values. The other pixel values are determined by using the preceding value of the same color, already decoded, (Xpred(x,y)=Xdeco(x−2, y)) as well as the change that was between the original pixel and the preceding pixel of the same color (value=Xdiff=Xorig(x,y)−Xpred(x,y)). The decoding apparatus 20 does not know the original value Xorig(x,y) but the encoding apparatus 10 may have calculated the difference between the original and the predicted value, i.e. Xdiff(x,y)=Xorig−Xpred. The calculated difference value is then quantized, if necessary, and the absolute value of the difference value and the sign are transmitted to the decoding apparatus 20. The decoding apparatus 20 retrieves the encoded bits and determines the decoded pixel value Xdeco on the basis of the predicted value and the decoded difference value (Xdeco(x,y)=Xpred(x,y)+decodedXdiff(x,y)).

The decoding apparatus 20 has information on the length of the bit strings wherein it can determine the row and column indices of the pixel to be decoded. It is also possible that the encoded image information contains information on the size of the image, information on the structure of the blocks in the image, information on the synchronization pixels of the blocks (location, amount), information on the color filter of the image (Bayer image, RGB image, etc.), information on the encoding methods, and/or thresholds and offsets relating to the encoding methods, or this information may have been separately stored or defined for the decoding apparatus 20. The latter alternative is applicable e.g. when the decoding apparatus 20 is designed to be used in such a system only in which all images are encoded using the same set of encoding methods and encoding parameters.

The decoding apparatus 20 may be implemented in the hardware and/or software of the device 30, e.g. in the processing element 32.

The device 30 may receive the bit stream by a receiver 31 from e.g. the encoding apparatus 10, from a camera 1 which comprises the encoding apparatus 10, from a wireless communication device, from a transmitting station, from a server, from the internet, from a storage means, such as a video tape recorder, a hard disk drive, a memory card, or an internal memory 33 of the device 30. The encoded image may have been formed by using e.g. the encoding apparatus 10 or other apparatus which is able to encode the image on a block-by-block basis.

The bit stream comprises bit strings in which block-by-block encoded pixel values of one or more image have been stored as disclosed above. If the decoding apparatus 20 starts the decoding after receiving the first bit string there is no need to store every bit string of one block of the image to be decoded.

It is, however, possible that the decoding apparatus 20 first stores all bit strings of one or more blocks of the image, or all bit strings of all blocks of the image to be decoded before the decoding process is started. In this alternative some memory is needed for storing the bit strings to wait for the decoding.

When the decoding apparatus 20 starts to decode the image, some variables may be set to their initial values. The decoded block counter 21.1, the row index counter 21.2, and the column index counter 21.3 will be set to 0 to indicate that the decoding of the first block is to be performed.

In this example embodiment the decoding apparatus 20 comprises a code word interpreter 24, decoding elements 25.1-25.5, a predictor 26, and a memory 22, in which some memory areas can be reserved for different purposes.

In the following explanation of the operation of the decoding apparatus 20 it is assumed that all bit strings of one encoded block of an image are received and buffered into a bit string buffer 22.2. Because the block structure of the image is known by the decoding apparatus 20 the number of bit strings in each block and the lengths of the bit strings are also known by the decoding apparatus 20. However, it is also possible that the bit strings are received and processed one by one therein a shorter bit string buffer 22.2 is sufficient, or that the bit strings of the whole image are received at once wherein the bit string buffer 22.2. needs storage capacity for all bit strings of one image. If the decoding apparatus 20 has access to a memory in which the encoded image has been stored, it is not always necessary to retrieve the bit strings from the image memory to the bit string buffer 22.2 but the encoding apparatus 20 can directly use information stored into the image memory.

In the following, it is assumed that the bit strings are temporarily stored into the bit string buffer 22.2 for processing.

The decoding apparatus 20 receives the bit strings of one encoded image from another device or retrieves the bit strings from the encoded image memory 22.1 (FIG. 3a). The received/retrieved bit strings are stored into the bit string buffer 22.2. The length of the bit string buffer 22.2 is selected e.g. so that bit strings of a largest block can be stored into the bit string buffer 22.2. If the length of all the encoded bit strings is the same, then the number of bits required in the bit string buffer 22.2 can be calculated by multiplying the length of the bit string with the number of pixels in the largest block. If, however, the bit string which carries the encoded synchronizing pixel value is longer than the other bit strings, the maximum size required to store encoded values of one block can be calculated by adding to the above mentioned multiplication result the number of additional bits in the bit strings carrying the encoded synchronizing pixel values.

When the bit strings of the first block of the image to be decoded have been stored into the bit string buffer 22.2, the code word interpreter 24 of the decoding apparatus examines the first code word and determines which decoding method should be used in decoding the value. However, the decoding apparatus 20 is aware that the first bit string comprises one or more encoded synchronization pixel values and it is not necessary to interpret the code word of the bit string. Therefore, there is no need to have the code word in the bit string. Hence, the value field can have one additional bit to be used in encoding the value e.g. by using the PCM1 encoding method described above. If, however, should a code word be used, it should be the escape sequence "1" in this example embodiment. The code word interpreter 24 selects the first decoding method and passes the first bit string or the value field of the first bit string to the first decoding element 25.1.

The first decoding element 25.1 decodes the value using the decoding method which corresponds with the first encoding method. In this example embodiment the first encoding method is PCM wherein the first decoding element 25.1 dequantizes the value by multiplying it with the first quantizer Q1 and adds the first offset value O1 to the multiplication result: decodedXorig(x,y)=Q1*value+O1. The decoded value is stored into the decoded pixel memory 22.3 and also into a decoded image memory 22.4. Further, the column index counter 21.3 is increased by one.

Then the next bit string will be processed. The code word interpreter 24 examines the code word of the next bit string and selects the decoding method on the basis of the code word. Again, the second bit string carries the synchronization value for the second color, wherein the first decoding method is selected and the second bit string or the value field of the second bit string is passed to the first decoding element 25.1 for decoding the value. The decoded value is stored into the decoded pixel memory 22.3 and also into the decoded image memory 22.4, and the column index counter 21.3 is increased by one. Also the second bit string need not have the code word when the decoder is aware of that the second bit string carries information on the second synchronization value. In fact, all bit strings relating to synchronization values can be encoded without adding the code word into the bit string, if the decoder can use other information to deduce that the bit string is carrying information on a synchronization value.

The third bit string comprises information on a predicted pixel value. The code word interpreter 24 examines the code word of the next bit string and selects the decoding method which corresponds with the encoding method with which the value in the bit string has been encoded. In this example, the decoding method is one of the second to fifth decoding methods. If the code word interpreter 24 has determined that the second decoding method should be used, the bit string or at least the sign and value field of the bit string is passed to the second decoding element 25.2 for decoding the value. Else if the code word interpreter 24 has determined that the third decoding method should be used, the bit string or at least the sign and value field of the bit string is passed to the third decoding element 25.3 for decoding the value. Else if the code word interpreter 24 has determined that the fourth decoding method should be used, the bit string or at least the sign and value field of the bit string is passed to the fourth decoding element 25.4 for decoding the value. Else if the code word interpreter 24 has determined that the fifth decoding method should be used, the bit string or at least the value field of the bit string is passed to the fifth decoding element 25.5 for decoding the value.

When the encoding method has used a predicted value (second to fourth encoding methods) in the encoding, also the decoding method uses the corresponding information i.e. the decoded value of a preceding pixel. Therefore, the code word interpreter 24 may instruct the first predictor 26.1 to retrieve the corresponding decoded pixel value (the previous decoded pixel value of the same color on the same row) and pass the pixel value to the selected decoding element which is one of the second to fourth decoding elements 25.2-25.4. The selected decoding element 25.2-25.4 uses the predicted pixel value, the sign, and the value in the bit string to calculate the decoded pixel value for the current pixel.

The decoded value is stored into the decoded pixel memory 22.3 and also into the decoded image memory 22.4, and the column index counter 21.3 is increased by one.

When the bit strings of the first row of the block have been decoded, the row index counter 21.2 is increased by one and the column index counter 21.3 is initialized to zero.

The decoding of the second and subsequent rows is performed in the similar way than the decoding of the first row, if the synchronization pixels have been selected for each row (Example 2 above). Therefore, it is not necessary to repeat the disclosure of the operation of the decoding apparatus 20 to describe the decoding of the remaining rows of the block.

If there is only one starting point for each block (Example 1 above), i.e. the first and second pixels at the first and second row are synchronizing pixels, the decoding of the second row of the block proceeds in the similar way than the decoding of the first row. The decoding of the third and subsequent rows slightly deviates from the decoding of the first and second row.

The decoding of the third and subsequent rows of one block can proceed in the following way. The bit string containing the encoded information of the first pixel of the third row is processed. The code word interpreter 24 examines the code word of this bit string and selects one of the second to fifth decoding method because this pixel is not a synchronization pixel. The sign and value is passed to the selected decoding element 25.2-25.5. The second predictor 26.2 retrieves the corresponding decoded pixel value (the previous decoded pixel value of the same color on the same column) from the decoded pixel memory 22.3, passes the pixel value to the selected decoding element 25.2-25.5 and uses the decoded pixel value, sign, and value to calculate the decoded pixel value. The decoded pixel value is stored into the decoded pixel memory 22.3 and also into the decoded image memory 22.4. Further, the column index counter 21.3 is increased by one.

Decoding the second value of the third row has no preceding value in the same row. Hence, in the decoding the preceding decoded pixel value of the same color on the same column is used as the preceding value and thus the decoding the second pixel value of the third row is analogous to the decoding of the first pixel value of the third row. The rest of the pixels of the third row can be decoded by using the preceding value of the same color on the same row.

In summary, in connection with Bayer image format the two first pixels on the third row onward are decoded using the preceding decoded pixel value of the same color on the same column as reference values, and the pixels on columns three onward are decoded using the preceding decoded pixel value of the same color on the same row as reference values (assuming that the encoding-decoding process is performed row-by-row).

The storage capacity of the decoded pixel memory 16.1 of the encoding apparatus 10 and the corresponding decoded pixel memory 22.3 of the decoding apparatus 20 should correspond with the amount of memory required for storing one decoded reference pixel value for each color in the row i.e. two decoded pixels when Bayer image format is used. In addition to that, if only one starting point for each block has been selected, the vertical synchronization requires that the first synchronization pixel values for each color in one row are available when predicting pixel values of the second, third etc. rows of the block. Therefore, storage capacity for four pixel values are needed in the decoded pixel memories 16.1, 22.3.

When all pixels of one block have been decoded, the decoded block counter 21.1 is increased by one, the bit strings of the next block are received from the image source or retrieved from the memory and stored into the bit string buffer 22.2. The operation of the decoding follows the principles presented above. Therefore, it is not necessary to repeat the description of the decoding process here.

The decoding apparatus 20 can use information on the decoded block counter 21.1, the row index counter 21.2, and the column index counter 21.3 to determine the block size of the current block, to determine the end of a row inside a block, and to determine the end of blocks (i.e. the end of the image). In connection with this bit conversion (10-7-10), the encoding/decoding is carried out in a way similar to the conversion from 10 bits to eight bits. However, it must be noted that the code words used and the ranges corresponding to them can be different.

In the following the operation of the invention will be disclosed in connection with rotating an image. The image has been encoded to compress the image to a smaller size. The encoded image is stored e.g. into the memory 16.2 of the encoding apparatus 10. Then the values inside a block of the image are decoded to obtain a replica of the original image block. Then the block is rotated and after that encoded again. After the rotation the synchronization pixels are changed. Also the block numbers are changed as well as the amount of pixels and blocks in vertical and horizontal direction. FIG. 1a shows an image before rotation and FIG. 1b shows how the example image arrangement has changed after 90 degree rotation to the right.

For example, when encoding the block in the upper left corner of the rotated image, the first two pixels of the first line and the first pixels of the second line of the rotated block can be used as synchronizing values, or the first two pixel values of each line when the Bayer image format has been used. As can be seen from FIGS. 1a and 1b, the synchronization values of the original (not rotated) image are at the upper right corners of the blocks, if the upper left corner was originally used as the starting point. Also the number of lines of each rotated block corresponds to the number of rows of the original block, and the number of rows of each rotated block corresponds to the number of lines of the original block. After the encoding process the rotated image can e.g. be stored into the memory 16.2 and/or transmitted to the decoding apparatus 20. However, it is also possible to change the scanning order of the blocks after the rotation wherein the synchronization pixels of the original image can also be used as the synchronization pixels of the rotated image. It is also possible that the image is rotated without decoding and re-encoding the image. This can be performed by changing the scanning order of the blocks. Hence, the image can be encoded and decoded as indicated above and the decoded image is a rotated version of the original image.

The invention can also be implemented in connection with cropping an image. The image has been encoded to compress the image to a smaller size. The encoded image is stored e.g. into the memory 16.2 of the encoding apparatus 10. Then the values inside a block of the image are decoded to obtain a replica of the original image block. Then the block is cropped wherein a portion of the image is to be encoded. In the cropped image the block sizes and the amount of the blocks need not be the same than in the original image. Also the synchronization pixels and the aspect ratio may change. After the edges of the cropped image have been defined, the cropped image is divided into blocks and the blocks are encoded and e.g. stored into the memory. In FIG. 1a the dashed rectangle shows the area of the cropped image which will be encoded instead of the whole image.

The rotation and cropping is performed by decoding the image to be rotated/cropped and after that the modified image is encoded, when necessary. Therefore, the apparatus has both the decoder and encoder functionality. However, it is not always necessary to encode the modified image but the purpose may be, for example, to display the modified image on a display 34 of the device 30. In that kind of situation the encoder functionality is not necessarily needed. Displaying an image on the display 34 needs some other kind of image processing 35 than presented above.

When an image is cropped and the cropping area does not fully correspond with block edges (as is the case in the example of FIG. 1a), it may be useful to retain as much of the original block structure as possible and define the edge blocks differently. In the example of FIG. 1a the blocks 7, 8, 13 and 14 could be retained whereas the other blocks 0, 1, 2, 3, 6, 9, 12, 15, 18, 21, 24-27 may need some reconstruction and selection of new synchronizing points. It may be possible that the encoding apparatus needs to decode and encode only such re-defined blocks and use the encoded versions of the original blocks as such when encoding the cropped image.

Figure 6:
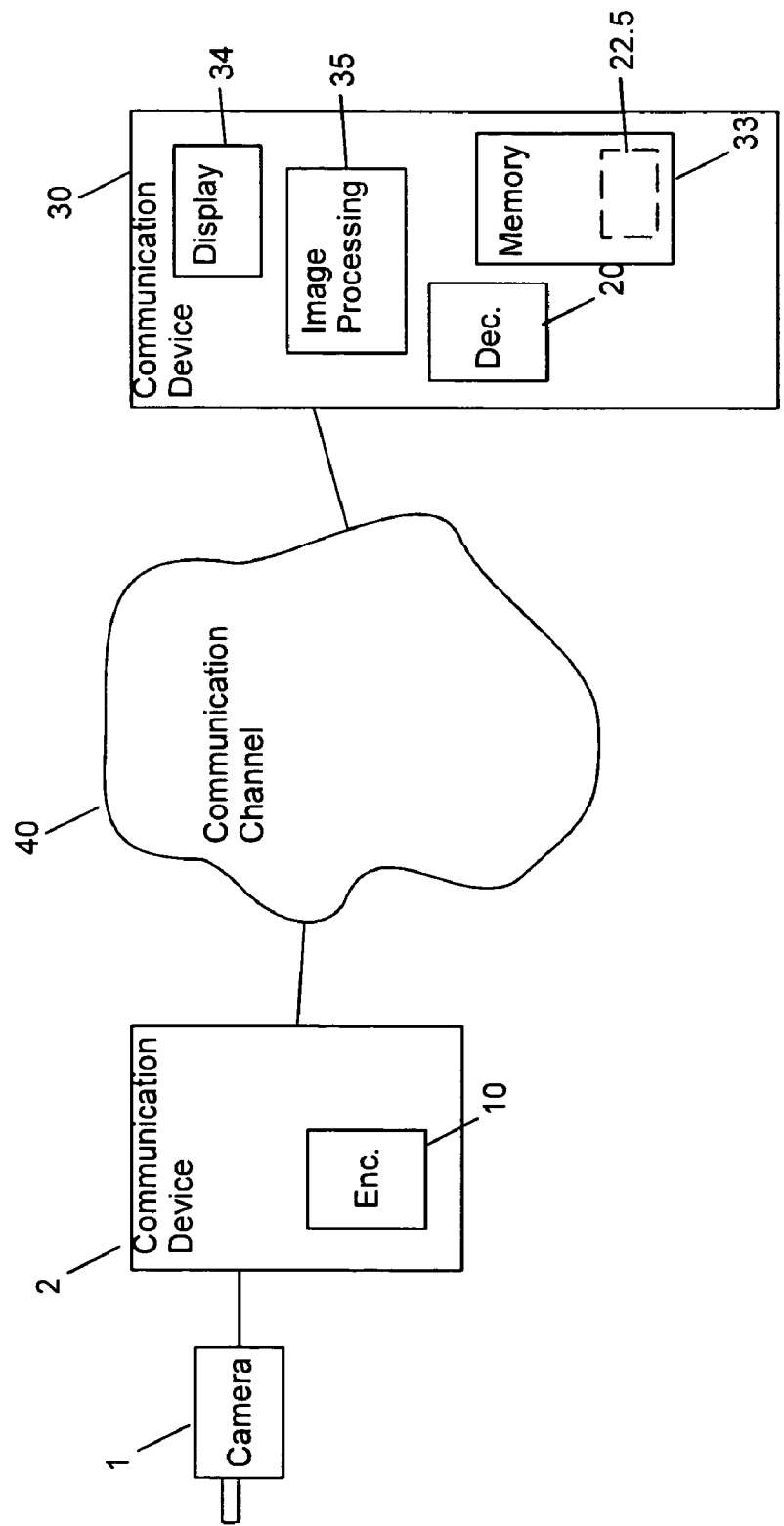
FIG. 6 depicts an example of a system for transmitting images encoded according to an example embodiment of the invention from one device to another device.

FIG. 6 depicts still a non-limiting example of a system implementing the invention. The system comprises the camera 1 which takes an image or images, a first communication equipment/device 2 including the encoding apparatus 10, a communication channel 40, and a second communication equipment 30 including the decoding apparatus 20. The encoding apparatus 10 forms the encoded image(s) wherein the first communication equipment 2 transmits the encoded image(s) via the communication channel 40 to the second communication equipment. The decoding apparatus 20 of the second communication equipment 30 decodes the encoded image(s), processes 35 it (them) and shows the image(s) on the display 34. The image(s) can also be stored in the memory 33 of the second communication equipment 30 in the encoded form or in the decoded form. It is also possible to decode only a part of the image e.g. to an optional cache memory 22.5 that the image processing needs at this time.

The above described principles can quite easily be modified to implement the invention in connection with other image formats than the Bayer image format. For example, if the image comprises pixels arranged in a line as repetitive sequences of red, green and blue (RGB), every third pixel is of the same color and, respectively, the offset is three pixels when a prediction value of a current pixel is calculated (Xdeco(x−3, y)).

If the invention is used in connection with a monochrome image (black and white image) only one synchronization point for a block or one synchronization point for each line of the block will be needed and the encoding can proceed pixel-by-pixel in such a way that the second pixel of a line is predicted on the basis of the first pixel, the third pixel is predicted on the basis of the second pixel etc (Xdeco(x−1, y)).

The encoding/decoding apparatuses can be formed as a unit comprising both functionalities. Such a combination can also be called as a codec. The encoding and decoding apparatuses presented in this application is designed, for example, for the very high quality lossy conversion from 12 bit raw Bayer data to the ~8-bit storage to the memory. This codec is also optimized so that image can be easily rotated (and cropped) and the image can be processed block by block instead of line by line processing.

There are multiple solutions how the compression method could be used when it is made block based. The compression can be based on existing compression methods and some of them have been disclosed in the patent application PCT/FI2004/000008 of the same applicant and it is incorporated herein by reference (see corresponding U.S. application Ser. No. 10/755,868 filed Jan. 12, 2004 and published Oct. 14, 2004 under US Publication Number 2004/0202375 A1).

Pixels which are encoded without using information of other pixels can be used as synchronization pixels. If all pixels of a block of an image are encoded using e.g. pulse code modulation, quantization, or look-up-tables, the selection of the synchronization pixels is quite flexible and can be modified quite easily when needed. Also the rotation can be simplified when there are multiple of pixels which can be used as synchronization points.

The size of bits used for each block is known. However, the size need not be same for all blocks but both the encoding apparatus and the decoding apparatus can determine the length of the bit strings and the amount of bit strings for each block. That information may have been programmed to the apparatuses or the encoding device can include in the bit stream or separately transmit the necessary information to the decoding apparatus. The information may comprise size of blocks specified e.g. as follows:

the horizontal size of the first block (first_horiz_size);
the horizontal size of the subsequent blocks (other_horiz_size);
the horizontal size of the last block (last_horiz_size),
the vertical size of the first block (first_vert_size);
the vertical size of the subsequent blocks (other_vert_size);
the vertical size of the last block (last_vert_size), An amount of blocks can be specified based on the image size and the block sizes or the image size can be specified by the amount of blocks and the block sizes. It may not be needed to specify all of them separately.

The horizontal size of the subsequent blocks (other_horiz_size) and the vertical size of the subsequent blocks (other_vert_size) can be multiplicative with the amount of different pixel colors. For example, in Bayer image (2×2) both of the parameters other_horiz_size and other_vert_size are divisible by two, and in RBG (3×1) the parameter other_horiz_size is divisible by three and the parameter other_vert_size is divisible by one. The size of the border blocks need not be multiplicative with the amount of pixel colors. If the horizontal or vertical size of the subsequent blocks is not multiplicative with the amount of different colors then the order of the color pattern inside the block will change and it should be taken into account mathematically or informed separately.

In the example embodiment presented in FIGS. 1a and 1b most of the blocks have the same actual block size and also the amount of bits for each block is the same. The amount of bits in one block can be calculated e.g. as follows: actual_block_size_pix*bits/pix+synchro_bits*synchro_bit_delta, in which actual_block_size_pix=actual block size in pixels,
synchro_bits=the amount of synchronization pixels,
synchro_bit_delta=the difference between the bit width of the synchronization pixels and the bit width of non-synchronization pixels.

The minimum amount of synchronization pixels in the block is dependent on the amount of different pixel colors in a block. For example, in the above disclosed Bayer image four synchronization pixels are needed (R, Gr, Gb, B). It is also possible to use more synchronization pixels (e.g. for each line new synchronization pixels are used as in the Example 2 above).

Scanning order of blocks and also scanning order of pixels in the block need to be specified. Hence, as mentioned above the image does not always need to be decoded and then encoded again when image is rotated or cropped. By changing the scanning order it is also possible to rotate the image. The scanning order of pixels in the block specifies, which pixels are used as the synchronization pixels. These are the first pixels in the scanning order.

As it can be seen from FIGS. 1a and 1b only the size of border blocks (i.e. blocks at the edge of the image) at two edges of the image are different from the other blocks. These blocks in FIG. 1a are numbered as 5, 11, 17, 23, 24-29. They can also be similar in size as the others, but flexibility of the image size and the block size and cropping area may require that they should also be different and described separately. Because most of the blocks have a similar size they can be specified with a small amount of (header) information and also the synchronization points (e.g. starting point of each block) can be calculated easily. Hence, there is no need to store information on synchronization points separately or use synchronization codes.

There can be a header file that specifies the size of blocks, the size of image, the scanning order of blocks, the scanning order of pixels in the blocks, coding method(s), amount of synchronization pixels, etc. This information can also be part of the bit stream carrying the bit strings.

In the following some non-limiting examples of parameters relating to the block-by-block encoding-decoding method according the present invention and their possible value ranges are given:

| | |
|---|---|
| Horizontal Image Size: | 1 to 65535; |
| Vertical Image Size: | 1 to 65535; |
| Original Bit Width: | 1 to 255; |
| Encoded Bit Width: | 1 to Original Bit Width; |
| Predictor: | 0 = Simple, 1 = Advanced; |
| Horizontal Block Size: | 1 to a horizontal Image Size; |
| Vertical Block Size: | 1 to Vertical Image Size; |
| Horizontal Start Block Size: | 1 to Horizontal Block Size; |
| Vertical Start Block Size: | 1 to Vertical Block size; |
| Horizontal End Block Size: | 1 to Horizontal Block Size; |
| Vertical End Block Size: | 1 to Vertical Block size; |
| Synchronization mode: | 0 = every line, 1 = only top left corner; |
| Synchronization Bit Width: | 1 to 255. |

The scanning order of pixels in the blocks and the scanning order of blocks of the image can be from left to right-top to bottom; from left to right-bottom to top; from right to left-top to bottom; from right to left-bottom to top; from top to bottom-left to right; from top to bottom-right to left; from bottom to top-right to left; from bottom to top-left to right.

Although only one image was used in the above examples it is possible to implement the invention in connection with a sequence of images, for example to encode images from a video camera. Then, images are encoded block-by-block as disclosed above and stored for subsequent encoding and/or transmitted to a device capable of decoding the images.

The encoding apparatus 10 or some parts of it and/or the decoding apparatus 20 or some parts of it can also be implemented as one or more modules. For example, an encoding module can comprise the selector 14, and one or more of the encoding elements 13.1-13.5. Further, the encoding module can comprise the first predictor 11, the second predictor 17, the summing element 12 and/or the decoded pixel memory 16.1. A decoding module can comprise, for example, the code word interpreter 24, one or more of the decoding elements 25.1-25.5, the predictor 26, the decoded pixel memory 22.3, and/or the bit string buffer 22.2.

The invention claimed is:

1. An apparatus for encoding an image comprising a pixel matrix, said pixel matrix comprising pixels, wherein a pixel is represented by a first number of bits, the apparatus comprising:
    a determining element for defining two or more blocks of pixels from the pixel matrix, said determining element being further configured to define one starting point for each block of pixels, said starting point comprising one or more pixels;
    an encoding element configured to process the pixels of one block at a time to form encoded pixel values, wherein an encoded pixel value is represented by a second number of bits;
    the apparatus being configured to encode said one or more pixels of the starting point without using information of other pixels, and to encode other pixels of the same block by predicting the pixel value on a basis of a previously decoded pixel; and
    a bit string composer for forming bit strings on the basis of the encoded pixel values.

2. The apparatus according to claim 1, wherein the pixel matrix comprises a first number of rows and a second number of columns; said two or more blocks of pixels comprising:
    the first number of rows divided into two or more subsets of rows each having rows less than said first number of rows; and
    the second number of columns divided into two or more subsets of columns each having columns less than said second number of columns.

3. The apparatus according to claim 1 configured to process one row of pixels of one block at a time.

4. The apparatus according to claim 1, wherein said encoding element is configured to form a longer bit string from pixels of the starting point than from said other pixels.

5. The apparatus according to claim 1, wherein the pixel matrix comprises pixels of a first color, pixels of a second color, and pixels of a third color, the apparatus comprising one starting point defined for each color in each block of pixels.

6. The apparatus according to claim 5, wherein every second row of pixels comprises pixels of the first color and pixels of the second color, and every other row of pixels comprises pixels of the second color and pixels of the third color, the apparatus comprising:
    one starting point defined for the first color for each block of pixels;
    one starting point defined for the third color for each block of pixels;
    one starting point defined for the second color for a first row and for a second row in each block of pixels.

7. The apparatus according to claim 1, wherein the apparatus comprises one starting point defined for each row of each block of pixels, said starting point comprising one or more pixels of the row; and the apparatus is configured to:
    encode said one or more pixels of the starting point without using information of other pixels; and
    encode other pixels of the same row by predicting the pixel value on a basis of a previously decoded pixel.

8. The apparatus according to claim 7, wherein the pixel matrix comprises pixels of a first color, pixels of a second color, and pixels of a third color, said apparatus comprising:
    one starting point defined for the first color for every second row in each block of pixels;
    one starting point defined for the third color for every second row in each block of pixels;
    one starting point defined for the second color for every row in each block of pixels.

9. The apparatus according to claim 1, wherein the apparatus comprises a calculating element to determine a difference between the predicted pixel value and the original pixel value to encode the other pixels; and the apparatus is configured to use the difference in forming bit strings.

10. The apparatus according to claim 1 comprising a first encoding element and a set of second encoding elements; the apparatus being configured to select said first encoding element for encoding of the pixel of the starting point; and
    use said difference to select an encoding element for said other pixels from said set of second encoding elements.

11. The apparatus according to claim 10, said first encoding element is configured to use a pulse code modulation; and said set of second encoding elements are configured to use a set of differential pulse code modulation methods and a pulse code modulation method.

12. The apparatus according to claim 1, wherein the apparatus comprises an index counter for counting row and column indices; and that the apparatus is configured to use said index counter in determining if a pixel is a pixel of a starting point or another pixel.

13. An apparatus according to claim 1, further comprising:
    an image sensor comprising a matrix of photosensitive elements for forming pixel information; and
    a scanning element configured to scan the pixels of one block at a time.

14. An apparatus for decoding an image on the basis of encoded pixel values of blocks of a pixel matrix of the image, said pixel matrix comprising pixels represented by a first number of bits and said encoded pixel values being represented by a second number of bits, the apparatus comprising:
    a determining element for recovering a block structure of the image and one starting point for each block of pixels, said starting point comprising one or more pixels;
    a bit string decomposer for retrieving pixel information from the bit strings; and
    a decoding element configured to process the retrieved pixel information of one block at a time to restore the original number of bits of the pixels;
    the apparatus being configured to decode said one or more pixels of the starting point without using information of other pixels, and to decode said other pixels of the same block by using a predicted pixel value and a decoded difference value.

15. The apparatus according to claim 14 configured to process bit strings of one row of pixels of one block at a time.

16. The apparatus according to claim 14, wherein the pixel matrix comprises pixels of a first color, pixels of a second color, and pixels of a third color, the apparatus comprising one starting point defined for each color in each block of pixels.

17. The apparatus according to claim 16, wherein every second row of pixels comprises pixels of the first color and pixels of the second color, and every other row of pixels comprises pixels of the second color and pixels of the third color, the apparatus comprising:
    one starting point defined for the first color for each block of pixels;

one starting point defined for the third color for each block of pixels;
one starting point defined for the second color for a first row and for a second row in each block of pixels.

18. The apparatus according to claim 14, wherein the apparatus comprises one starting point defined for each row of each block of pixels, said starting point comprising one or more pixels of the row; and the apparatus is configured to:
decode said one or more pixels of the starting point without using information of other pixels; and
decode other pixels of the same row by using a predicted pixel value and a decoded difference value.

19. The apparatus according to claim 18, wherein the pixel matrix comprises pixels of a first color, pixels of a second color, and pixels of a third color, said apparatus comprising:
one starting point defined for the first color for every second row in each block of pixels;
one starting point defined for the third color for every second row in each block of pixels;
one starting point defined for the second color for every row in each block of pixels.

20. The apparatus according to claim 18, wherein said decoding element is configured to combine the predicted pixel value and the decoded difference value to form a decoded pixel value.

21. The apparatus according to claim 14 comprising a first decoding element and a set of second decoding elements; the apparatus being configured to select said first decoding element for decoding of the pixel of the starting point; and
select a second decoding element from said set of second encoding elements for decoding said other pixels.

22. The apparatus according to claim 21, wherein said bit string decomposer is configured to use a code word encoded in the bit string to select said second decoding element.

23. The apparatus according to claim 14, wherein the apparatus comprises an index counter for counting row and column indices; and that said bit string decomposer is configured to use said index counter in determining whether a bit string comprises information relating to a pixel of a starting point or information relating to another pixel.

24. A module for encoding an image comprising a pixel matrix, said pixel matrix comprising pixels, wherein a pixel is represented by a first number of bits, the module comprising one or more processors, and one or more memories including computer program code, the one or more memories and the computer program code configured, with the one or more processors, to cause the module to perform at least the following:
defining two or more blocks of pixels from the pixel matrix by defining one starting point for each block of pixels, said starting point comprising one or more pixels;
predicting a pixel value on a basis of a previously decoded pixel;
determining a difference between the predicted pixel value and an original pixel value; and
processing the pixels of one block at a time to form encoded pixel values, wherein an encoded pixel value is represented by a second number of bits;
encoding said one or more pixels of the starting point without using information of other pixels, and using said difference to encode other pixels of the same block.

25. A module according to claim 24 further comprising a bit string composer for forming bit strings on the basis of the encoded pixels.

26. A module for decoding an image on the basis of encoded pixel values of blocks of a pixel matrix of the image, said pixel matrix comprising pixels represented by a first number of bits and said encoded pixel values being represented by a second number of bits, the module comprising one or more processors, and one or more memories including computer program code, the one or more memories and the computer program code configured, with the one or more processors, to cause the module to perform at least the following:
recovering a block structure of the image and one starting point for each block of pixels, said starting point comprising one or more synchronization pixels; and
processing the retrieved pixel information of one block at a time to restore the original number of bits of the pixels;
decoding said one or more pixels of the starting point without using information of other pixels, and decoding said other pixels of the same block by using a predicted pixel value and a decoded difference value.

27. A module according to claim 26 further comprising a bit string decomposer for retrieving pixel information from the bit strings.

28. A wireless communication device for encoding an image comprising a pixel matrix, said pixel matrix comprising pixels, wherein a pixel is represented by a first number of bits, the device comprising:
a determining element for defining two or more blocks of pixels from the pixel matrix, said determining element being further configured to define one starting point for each block of pixels, said starting point comprising one or more pixels;
an encoding element configured to process the pixels of one block at a time to form encoded pixel values, wherein an encoded pixel value is represented by a second number of bits;
the device being configured to encode said one or more pixels of the starting point without using information of other pixels, and to encode other pixels of the same block by predicting the pixel value on a basis of a previously decoded pixel; and
a bit string composer for forming bit strings on the basis of the encoded pixel values.

29. A wireless communication device according to claim 28 further comprising
an image sensor comprising a matrix of photosensitive elements for forming pixel information; and
a scanning element configured to scan the pixels of one block at a time.

30. A wireless communication device for decoding an image on the basis of encoded pixel values of blocks of a pixel matrix of the image, said pixel matrix comprising pixels represented by a first number of bits and said encoded pixel values being represented by a second number of bits, the device comprising:
a determining element for recovering a block structure of the image and one starting point for each block of pixels, said starting point comprising one or more pixels;
a bit string decomposer for retrieving pixel information from the bit strings; and
a decoding element configured to process the retrieved pixel information of one block at a time to restore the original number of bits of the pixels;
the device being configured to decode of said one or more pixels of the starting point without using information of other pixels, and to decode said other pixels of the same block by using a predicted pixel value and a decoded difference value.

31. A wireless communication device according to claim 30, further comprising
   an image sensor comprising a matrix of photosensitive elements for forming pixel information; and
   a scanning element configured to scan the pixels of one block at a time.

32. A method for encoding an image comprising a pixel matrix, said pixel matrix comprising pixels, wherein a pixel is represented by a first number of bits, the method comprising:
   defining two or more blocks of pixels from the pixel matrix, and one starting point for each block of pixels, said starting point comprising one or more pixels;
   processing the pixels of one block at a time to form encoded pixel values, wherein an encoded pixel value is represented by a second number of bits, wherein said processing comprises
   encoding said one or more synchronization pixels of the starting point without using information of other pixels;
   using a difference between a predicted pixel value and an original pixel value to encode other pixels of the same block by predicting a pixel value on a basis of a previously decoded pixel; and
   forming bit strings on the basis of the encoded pixels.

33. The method according to claim 32, wherein the pixel matrix comprises a first number of rows and a second number of columns; the method comprising defining said two or more blocks of pixels by:
   dividing the first number of rows into two or more subsets of rows each having rows less than said first number of rows; and
   dividing the second number of columns into two or more subsets of columns each having columns less than said second number of columns.

34. The method according to claim 32, wherein the processing of pixels is performed by processing one row of pixels of one block at a time.

35. The method according to claim 32, comprising forming a longer bit string from pixels of the starting point than from said other pixels.

36. The method according to claim 32, wherein the pixel matrix comprises pixels of a first color, pixels of a second color, and pixels of a third color, the method comprising defining one starting point for each color in each block of pixels.

37. The method according to claim 36, wherein every second row of pixels comprises pixels of the first color and pixels of the second color, and every other row of pixels comprises pixels of the second color and pixels of the third color, the method comprising:
   defining one starting point for the first color for each block of pixels;
   defining one starting point for the third color for each block of pixels;
   defining one starting point for the second color for a first row and for a second row in each block of pixels.

38. The method according to claim 32, wherein the method comprises
   defining one starting point for each row of each block of pixels, said starting point comprising one or more pixels of the row;
   encoding said one or more pixels of the starting point without using information of other pixels; and
   encoding other pixels of the same row by predicting the pixel value on a basis of a previously decoded pixel.

39. The method according to claim 38, wherein the pixel matrix comprises pixels of a first color, pixels of a second color, and pixels of a third color, the method comprising:
   defining one starting point for the first color for every second row in each block of pixels;
   defining one starting point for the third color for every second row in each block of pixels;
   defining one starting point for the second color for every row in each block of pixels.

40. The method according to claim 32, wherein said encoding other pixels comprises determining a difference between the predicted pixel value and the original pixel value; and
   using the difference in forming said bit strings.

41. The method according to claim 32, comprising defining a first encoding method and a set of second encoding methods;
   said encoding said one or more pixels of the starting point comprising using said first encoding method in encoding of the pixel of the starting point; and
   said encoding other pixels comprising using said difference to select an encoding method for said other pixels from said set of second encoding methods.

42. The method according to claim 41, said first encoding method comprising a pulse code modulation; and said set of second encoding methods comprising a set of differential pulse code modulation methods and a pulse code modulation method.

43. A method for decoding an image comprising encoded pixel values of blocks of a pixel matrix of the image, said pixel matrix comprising pixels represented by a first number of bits and said encoded pixel values being represented by a second number of bits, the method comprising:
   recovering a block structure of the image;
   defining one starting point for each block of pixels, said starting point comprising one or more pixels;
   retrieving pixel information from bit strings; and
   processing the retrieved pixel information of one block at a time to restore the original number of bits of the pixels, wherein said processing comprises decoding of the one or more pixels of the starting point without using information of other pixels, and decoding other pixels of the same block, wherein said other pixels are decoded by using a predicted pixel value and a decoded difference value.

44. The method according to claim 43, wherein the pixel matrix comprises a first number of rows and a second number of columns; said block structure of the image comprising:
   said first number of rows divided into two or more subsets of rows each having rows less than said first number of rows; and
   said second number of columns divided into two or more subsets of columns each having columns less than said second number of columns.

45. The method according to claim 43 wherein the pixel matrix comprises pixels of a first color, pixels of a second color, and pixels of a third color, the method comprising defining one starting point for each color in each block of pixels.

46. The method according to claim 45, wherein every second row of pixels comprises pixels of the first color and pixels of the second color, and every other row of pixels comprises pixels of the second color and pixels of the third color, the method comprising:
   defining one starting point for the first color for each block of pixels;
   defining one starting point for the third color for each block of pixels;
   defining one starting point for the second color for a first row and for a second row in each block of pixels.

47. The method according to claim 45 comprising defining a first decoding method and a set of second decoding methods;
- said decoding said one or more pixels of the starting point comprising using said first decoding method in decoding of the pixel of the starting point; and
- said decoding other pixels comprising using a code word encoded in the bit string to select a decoding method for said other pixels from said set of second decoding methods.

48. The method according to claim 47, said first decoding method comprising a pulse code modulation; and said set of second decoding methods comprising a set of differential pulse code modulation methods and a pulse code modulation method.

49. The method according to claim 43, wherein the method comprises
- defining one starting point for each row of each block of pixels, said starting point comprising one or more pixels of the row;
- decoding said one or more pixels of the starting point without using information of other pixels; and
- decoding other pixels of the same row by using a predicted pixel value and a decoded difference value.

50. The method according to claim 49, wherein the pixel matrix comprises pixels of a first color, pixels of a second color, and pixels of a third color, the method comprising:
- defining one starting point for the first color for every second row in each block of pixels;
- defining one starting point for the third color for every second row in each block of pixels;
- defining one starting point for the second color for every row in each block of pixels.

51. A non-transitory computer readable medium storing a computer program for encoding an image comprising a pixel matrix, said pixel matrix comprising pixels, wherein a pixel is represented by a first number of bits, the computer program comprising instructions for:
- defining two or more blocks of pixels from the pixel matrix, and one starting point for each block of pixels, said starting point comprising one or more pixels;
- processing the pixels of one block at a time to form encoded pixel values, wherein an encoded pixel value is represented by a second number of bits, wherein said processing comprises
- encoding said one or more pixels of the starting point without using information of other pixels;
- using a difference between a predicted pixel value and an original pixel value to encode other pixels of the same block by predicting a pixel value on a basis of a previously decoded pixel; and
- forming bit strings on the basis of the encoded pixels.

52. A non-transitory computer readable medium storing a computer program for decoding an image comprising encoded pixel values of blocks of a pixel matrix of the image, said pixel matrix comprising pixels represented by a first number of bits and said encoded pixel values being represented by a second number of bits, the computer program comprising instructions for:
- recovering a block structure of the image;
- defining one starting point for each block of pixels, said starting point comprising one or more pixels;
- retrieving pixel information from bit strings; and
- processing the retrieved pixel information of one block at a time to restore the original number of bits of the pixels, wherein said processing comprises decoding of the one or more pixels of the starting point without using information of other pixels, and decoding other pixels of the same block, wherein said other pixels are decoded by using a predicted pixel value and a decoded difference value.

* * * * *